US008706310B2

(12) United States Patent
Barrilleaux

(10) Patent No.: US 8,706,310 B2

(45) Date of Patent: Apr. 22, 2014

(54) GOAL-BASED CONTROL OF LIGHTING

(75) Inventor: Jonathan M. Barrilleaux, Oakland, CA (US)

(73) Assignee: Redwood Systems, Inc., Fremont, CA (US)

( * ) Notice: Subject to any disclaimer, the term of this patent is extended or adjusted under 35 U.S.C. 154(b) by 547 days.

(21) Appl. No.: 12/815,886

(22) Filed: Jun. 15, 2010

(65) Prior Publication Data

US 2011/0307112 A1 Dec. 15, 2011

(51) Int. Cl.

| | |
|---|---|
| ***G05B 15/02*** | (2006.01) |
| ***G05D 3/12*** | (2006.01) |
| ***F21V 33/00*** | (2006.01) |
| ***F21V 1/00*** | (2006.01) |
| ***F21V 7/04*** | (2006.01) |
| ***G02B 17/00*** | (2006.01) |

(52) U.S. Cl.

USPC ............. 700/291; 362/85; 362/466; 362/552; 362/576; 700/9; 700/295

(58) Field of Classification Search

USPC ........... 700/295, 9, 295.9, 291; 362/552, 576, 362/466, 85

See application file for complete search history.

(56) References Cited

U.S. PATENT DOCUMENTS 4,152,752 A * 5/1979 Niemi ........................... 362/576
4,282,514 A * 8/1981 Elkin et al. ....................... 341/78
4,631,675 A * 12/1986 Jacobsen et al. ................ 700/90
4,646,206 A * 2/1987 Bauer et al. ................... 362/552
4,827,395 A * 5/1989 Anders et al. ..................... 700/9
5,406,173 A * 4/1995 Mix et al. ....................... 315/156
5,706,191 A * 1/1998 Bassett et al. ..................... 700/9
5,753,983 A * 5/1998 Dickie et al. ............... 307/141.4
5,812,422 A 9/1998 Lyons ........................... 364/512
6,058,216 A * 5/2000 Endo et al. .................... 382/247
6,785,592 B1 8/2004 Smith et al. .................... 700/291
6,842,668 B2 * 1/2005 Carson et al. ................. 700/286
6,967,565 B2 11/2005 Lingemann .............. 340/310.01
6,990,394 B2 * 1/2006 Pasternak ...................... 700/295
7,018,084 B2 * 3/2006 Gotfried ........................ 362/576
7,841,759 B2 * 11/2010 Chen et al. .................... 362/612
8,027,752 B2 * 9/2011 Castaldo et al. .............. 700/296
2002/0147504 A1 * 10/2002 Sakasegawa et al. ............. 700/9
2002/0147508 A1 10/2002 Miller et al. ..................... 700/30
2003/0036810 A1 * 2/2003 Petite ................................ 700/9

(Continued)

OTHER PUBLICATIONS

Lighting and Productivity, downloaded Jan. 11, 2010, pp. 1-9, available at www.lightingdesignlab.com.

(Continued)

*Primary Examiner* — Kavita Padmanabhan
*Assistant Examiner* — Thomas Stevens
(74) *Attorney, Agent, or Firm* — Myers Bigel Sibley & Sajovec, P.A.

(57) ABSTRACT

A goal-based control system may be provided that controls lighting based on high-level management goals for the operation of a lighting system. The system may include a lighting system model. The system may convert the high-level management goals into low-level device control parameters that include a power level for each respective one of the light fixtures, where the system determines that a modeled operation of each respective one the light fixtures at the power level meets the management goals based on the lighting system model. The system may cause each respective one of the light fixtures to operate at the power level. The system may determine a likelihood of satisfying the management goals.

18 Claims, 9 Drawing Sheets

(56) References Cited

U.S. PATENT DOCUMENTS

| | | | | |
|---|---|---|---|---|
| 2003/0090210 | A1* | 5/2003 | Bierman | 315/149 |
| 2004/0002792 | A1* | 1/2004 | Hoffknecht | 700/295 |
| 2004/0105264 | A1* | 6/2004 | Spero | 362/276 |
| 2004/0160199 | A1* | 8/2004 | Morgan et al. | 315/312 |
| 2005/0174473 | A1* | 8/2005 | Morgan et al. | 348/370 |
| 2007/0061050 | A1* | 3/2007 | Hoffknecht | 700/291 |
| 2007/0100571 | A1 | 5/2007 | Miki | 702/96 |
| 2007/0255461 | A1 | 11/2007 | Brickfield et al. | 700/295 |
| 2008/0303687 | A1 | 12/2008 | Sempel et al. | 340/825 |
| 2009/0198350 | A1 | 8/2009 | Thiele | 700/30 |
| 2009/0267540 | A1* | 10/2009 | Chemel et al. | 315/297 |
| 2010/0141153 | A1* | 6/2010 | Recker et al. | 315/149 |
| 2010/0185339 | A1* | 7/2010 | Huizenga et al. | 700/295 |
| 2010/0188009 | A1* | 7/2010 | Bull | 315/246 |
| 2010/0253244 | A1* | 10/2010 | Snook et al. | 315/307 |
| 2010/0259931 | A1* | 10/2010 | Chemel et al. | 362/249.02 |
| 2011/0046806 | A1* | 2/2011 | Nagel et al. | 700/291 |

OTHER PUBLICATIONS

DiLouie, Craig, Lighting Strategies—New Study Explores Lighting and Productivity Link, downloaded Jan. 11, 2010, pp. 1-3, available at www.buildinds.com.

European Search Report, dated Aug. 4, 2011, European Patent Application No. 11004454.2, European Patent Office, Germany, 5 pages.

* cited by examiner

GOAL-BASED CONTROL OF LIGHTING

BACKGROUND

1. Technical Field

This application relates to lighting and, in particular, to control of lighting.

2. Related Art

Conventional approaches for managing lighting systems involve significant involvement of installers or operators. Installers and operators set desired light levels for all of the individual light fixtures or for each group of light fixtures. The settings may be initiated by an installer and updated by an operator through system-specific modes, functions, parameters, and schedules. To be effective, skilled installers and trained operators that have a good understanding of the system—especially the low-level parameters and procedures that control the system—prepare the settings. Due to the complexity of the systems, the systems often achieve mediocre or even poor results with respect to worker productivity, energy efficiency, and overall satisfaction.

SUMMARY

A goal-based lighting controller may be provided that includes a network interface, a lighting system model, a goal module, a demand model, and a hardware interface module. The goal module may receive management goals for operation of the lighting system, where the management goals are without light level settings for light fixtures included in the lighting system. The demand model may convert the management goals into a power level for each respective one of the light fixtures, where the demand model determines that a modeled operation of each respective one the light fixtures at the power level meets the management goals based on the lighting system model of the lighting system. The hardware interface module may be in communication with the network interface. The hardware interface module may cause each respective one of the light fixtures to operate at the power level.

A computer-readable storage medium may be provided that includes at least one model of a lighting system and computer executable instructions. The instructions may be executable to receive management goals for the operation of the lighting system, to convert the management goals into a power level for each respective one of the light fixtures based on the at least one model of the lighting system, where the instructions executable to convert the management goals are further executable to determine the power level for each respective one of the light fixtures such that the management goals for a modeled operation of the lighting system are satisfied, and to determine a likelihood that operation of each respective one of the light fixtures at the power level satisfies the management goals.

A method to control lighting may also be provided. Management goals for operation of a lighting system may be received without the management goals including individual device control parameters for light fixtures in the lighting system. One or more predictive models may be provided that convert the management goals into a power level for each respective one of the light fixtures. The management goals may be converted into the power level for each respective one of the light fixtures by determining that the predictive models indicate the management goals are met with a modeled operation of each respective one of the light fixtures at the power level. Each respective one of the light fixtures may be caused to be powered at the power level.

Further objects and advantages of the present invention will be apparent from the following description, reference being made to the accompanying drawings wherein preferred embodiments of the present invention are shown.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
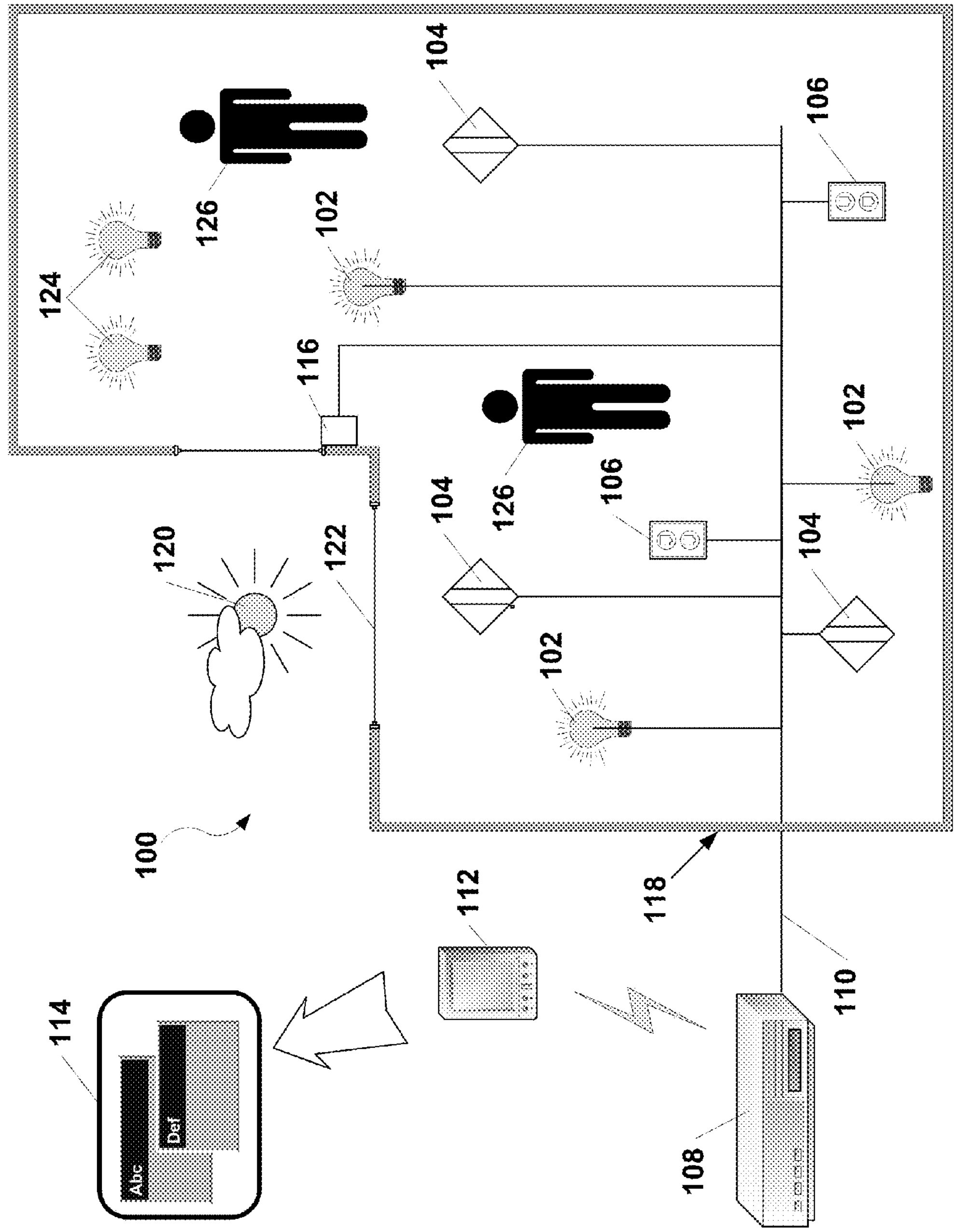
FIG. 1 illustrates an example of a lighting system for goal-based control of lighting.

A system may control lighting based on high-level management goals. An operator may set management goals, such as goals for worker productivity, system maintenance, energy savings, and/or aesthetic effect. The system includes predictive models that translate the management goals into low-level device control parameters, such as light levels, power levels, and temperatures for devices, such as light fixtures. The system may control the light fixtures with the device control parameters to best meet the management goals. The system may determine a confidence estimate indicating a likelihood that the system will meet the management goals. The system may measure actual performance against the management goals by obtaining real-time information about the system through user input and/or sensor data received from a network of sensors and devices distributed throughout a physical site. The sensors may detect motion, light, heat, power, or any other physical property. The predictive models may correct errors in or modify the generation of the device control parameters by adjusting the device control parameters based on the sensor data received.

In one example, the system may include one or more adaptive models that receive the sensor data. An adaptive model may predict usage patterns, such as occupant movement patterns through a physical site, natural light patterns, and patterns of occupants overriding light settings generated by a predictive model. The system may tune the predictive model based on the usage patterns in order to achieve short-term and long-term improvements in system performance and satisfaction of the management goals. The system may be implemented using predictive modeling techniques, distributed real-time sensing, and self-learning adaptive modeling, employing fuzzy logic, Monte Carlo, and/or artificial intelligence (AI) techniques. The system may thereby provide a high-level view of lighting control over a wide range of time-frames, and control the low-level device parameters from the high-level view.

One technical advantage of the systems and methods described below may be that light levels do not need to be manually set for each light fixture or for each set of light fixtures. In contrast, the predictive models may determine suitable light levels for the light fixtures such that, on the whole, the management goals may be met. Nevertheless, the system and methods may still facilitate manual override of light levels for one or more light fixtures. Another technical advantage of the systems and methods described below may be that an operator may adjust the management goals to reach a balance between conflicting management goals. For example, a productivity goal may conflict with an energy savings goal. The operator may, for example, lower the energy savings goal in order to realize the productivity goal.

1. Management Goals.

A management goal may be any aspect to consider in the overall control of lighting at one or more physical sites over time. Examples of management goals for a lighting system include a productivity goal, a maintenance goal, an aesthetic goal, an energy goal, and any other objective considered in the control of lighting. The management goals for a particular lighting system may include the productivity goal, the maintenance goal, the aesthetic goal, and the energy goal. The management goals for the particular lighting system may include fewer, different, or additional goals. In a first example, the management goals may include just the productivity and the energy goals. In a second example, the management goals may include just the productivity goal, the aesthetic goal, and an operational cost goal.

A goal may include a value, a range of values, or a set of values. For example, the goal may include a maximum value, a minimum value, ranges of values, or any combination thereof. In one example, goals may include sub-goals.

The productivity goal may be a goal for productivity that results from lighting. Productivity may be determined from a value indicative of worker performance, worker safety, worker well-being, crop yield, or any other measure of productivity influenced by lighting.

The productivity goal may include productivity sub-goals, such as a task lighting goal, a worker safety goal, a quality of lighting goal, a mood lighting goal, a crop yield goal, or a goal for any other component of productivity.

The task lighting goal may be a goal for task lighting. Task lighting may be determined from a value indicative of a lighting level at which each worker best performs his/her task. In one example, a particular task may require high illumination, such as for performing inspections. Alternative tasks may require low illumination, such as when computer displays are in use. In one example, the operator, such as an architect or lighting designer, may specify a target illuminance for an area, such as a work surface in a work space. The task lighting may be determined from the target illuminance set for areas in the physical site.

The worker safety goal may be a goal for worker safety resulting from lighting. Worker safety may be determined from a value indicative of minimal illumination levels in areas where lighting may be important for safety, such as in doorways, stairwells, or other locations where safety may be compromised if lighting is above or below a determined threshold. An architect, a lighting designer, building codes, or other sources may indicate a minimum illumination for areas in a site. Alternatively or in addition, the sources may indicate the duration of the illumination. Alternatively or in addition, worker safety may be determined from a value indicative of light levels to be provided by emergency lighting when abnormal conditions occur.

The quality of lighting goal may be a goal for minimizing lighting annoyances. The quality of lighting may be determined from a value indicative of lighting annoyances, such as light quality, a particular color rendering, a glare level, a frequency of cycling through light intensities, or any other lighting property that may be an annoyance to workers or otherwise negatively impact productivity. Color and glare may be controlled by proper lighting design, such as by light fixture selection and placement. Glare from natural light may be mitigated by active window shading (controlled by the lighting system) or passive window shading (manual or fixed). Frequent cycling through different light intensities may result from the lighting system trying to minimize energy consumption in an area that is intermittently occupied. The predictive models may address problems with cycling through light intensities by limiting frequency of change based on predictions and on feedback from sensors.

The mood lighting goal may be a goal for positive mood lighting effects. Mood lighting may be determined from a value indicative of mood lighting. Optimal mood lighting for a particular space may be specified by the operator, such as the architect or lighting designer. Studies have shown a relationship between worker productivity and lighting qualities, such as intensity and color, over time. Optimal mood lighting may correspond to these light qualities. Mood lighting may relate to positive psychological effects resulting from lighting whereas the quality of lighting relates to negative psychological effects of lighting quality. Optimum mood lighting may be achieved by providing a suitable light fixture placement, quality of light, and control of the light. In one example, suitable light fixture placement may involve using wall washers. Wall washers illuminate vertical surfaces to emphasize the surfaces and potentially to draw attention to items on the surfaces, such as pictures, fireplaces and wall hangings. Providing a suitable quality of light may involve avoiding glare and providing a broad spectrum of colors in the light. The light fixtures 102 may be control in order to vary the amount of glare and/or change the colors in the light generated by the light fixtures 102. Providing suitable control of the light may involve providing individual and scheduled dimmers.

The aesthetic goal may be a goal for aesthetic constraints resulting from lighting architectural features. In contrast to the productivity goal, the esthetic goal relates to lighting used for aesthetic effects instead of, or in addition to, being used for productivity. For example, aesthetic effects may be determined from a value indicative of illumination of architectural features that are to impress customers, impress competitors, meet civic expectations, or be used for any other artistic or externally imposed lighting purposes. Aesthetic lighting may be for interior effects, exterior effects, or both. Aesthetic lighting may often not be subject to occupancy or user control. Aesthetic lighting may be set by architects, lighting designers, zoning requirements, neighborhood covenants, and any other suitable source. For example, aesthetic lighting may be limited by regulations relating to energy efficiency or ecological/astronomical light pollution.

The maintenance goal may be a goal for maintenance. Maintenance may be a value indicative of costs associated with the maintenance of the lighting system. Light fixtures, even solid state ones, degrade over time and may fail. A light fixture failure may involve a failure of the light fixture as a unit (cabling, power, and communications), a failure of just the lamp in the light fixture, a degradation from an accumulation of lamp and reflector dirt, a loss of efficacy of the light fixture and/or lamp with age, or any other failure or degradation. Alternatively or in addition, costs associated with maintenance may include the cost of new lamps and light fixtures used to replace failed ones. Alternatively or in addition, costs associated with maintenance may include costs for staffing, equipment, inventory, loss of production, and increased energy consumption in older lamps. As light fixture efficacy decreases over age, whether due to age or dirt, energy consumption may increase in order to achieve the same intensity of illumination, which may also further accelerate aging. Light fixture location may affect the nature of the staff and equipment involved in maintenance. For example a ladder instead of a lift bucket may be used to change a lamp. Light fixture type, placement, and mounting may alter the frequency and duration of service. Service may include lamp/light fixture replacement and/or light fixture cleaning.

The energy goal may be a goal for energy, such as a goal for energy consumption or energy savings. Energy may be determined from a value indicative of the quantity of energy consumed, the cost of energy consumed, the quantity of energy saved, the cost of energy saved, or any combination thereof.

Energy costs may vary by time of day and year, as well as by minimum, maximum, and constant usage. Demand response, whereby an energy supplier demands an immediate reduction in consumption from an energy consumer, may have a major impact on energy costs paid by the energy consumer. The smart grid may facilitate lighting systems in acquiring energy cost information in real time.

The operational cost goal may be a goal for energy savings and maintenance. Therefore, the energy goal and the maintenance goal may be sub-goals of the operational cost goal in some embodiments. Any combination of goals and sub-goals may be used.

2. Lighting System.

The lighting system may include light fixtures that provide light to a physical site or multiple sites. A goal-based control system may interpret, control, and learn aspects of the operation of the light system based on the management goals set by the operator. In one example, the lighting system may include the goal-based control system. In a second example, the two systems may be physically separate from each other.

The lighting system, the goal-based control system, or both may be capable of controlling large commercial sites, such as office buildings, building campuses, factories, warehouses, and retail stores. The lighting system may control and obtain sensor data at rather high degrees of spatial resolution, such as receiving sensor data from each individual light fixture. The high resolution may increase the complexity of operating the systems through a traditional control system. Nevertheless, the goal-based control system may greatly increase overall system performance and simplify operation of the lighting system.

FIG. 1 illustrates an example of a lighting system 100 for goal-based control of lighting. The lighting system 100 may include light fixtures 102, sensors 104, input devices 106, and a goal-based lighting controller 108. The lighting system 100 may include additional, fewer, or different components. For example, the lighting system 100 may also include a data network 110. In one example the lighting system 100 may not include the goal-based lighting controller 108, but include one or more power devices (not shown) that power the light fixtures 102 and that are in communication with the goal-based lighting controller 108 over a communications network, such as the data network 110. In a second example, the lighting system 100 may include at least one user computing device 112, such as a tablet computer, that hosts a graphical user interface (GUI) 114 and that is in communication with the goal-based lighting controller 108 over the communications network. In a third example, the lighting system 100 may include load devices in addition to the light fixtures 102. For example, the load devices may include a switchable window 116 that adjusts the opacity of a window or position of an awning or louvers or other surface though which light may pass or be blocked or moderated based on an electric signal.

The light fixtures 102, the sensors 104, and the input devices 106 may be affixed to, attached to, or otherwise associated with a physical site 118. The physical site 118 may include any human-made structure used or intended for supporting or sheltering any use or continuous occupancy. For example, the physical site 118 may include a residential home, a commercial structure, a mobile home, or any other structure that provides shelter to humans, animals, or any other tangible items.

The goal-based lighting controller 108 may be in communication with the light fixtures 102, the sensors 104, and the input devices 106 over the data network 110. The data network 110 may be a communications bus, a local area network (LAN), a Power over Ethernet (PoE) network, a wireless local area network (WLAN), a personal area network (PAN), a wide area network (WAN), the Internet, Broadband over Power Line (BPL), any other now known or later developed communications network, or any combination thereof. For example, the data network 110 may include wiring electrically coupling the goal-based lighting controller 108 to devices, such as the light fixtures 102, the sensors 104, and the input devices 106, where the wiring carries both power and data. Alternatively, the data network 110 may include an overlay network dedicated to communication and another network delivers power to the devices.

The light fixtures 102 may be any electrical device or combination of devices that creates artificial light from electricity. The light fixture 102 may distribute, filter or transform the light from one or more lamps included or installed in the light fixture 102. Alternatively or in addition, the light fixture 102 may include one or more lamps and/or ballasts. The lamps may include an incandescent bulb, a LED (Light-emitting Diode) light, a fluorescent light, a CFL (compact fluorescent lamp), a CCFL (Compact Fluorescent Lamp), halogen lamp, or any other device now known or later discovered that generates artificial light. Examples of the light fixture 102 include a task/wall bracket fixture, a linear fluorescent high-bay, a spot light, a recessed louver light, a desk lamp, a commercial troffer, or any other device that includes one or more lamps.

The sensors 104 may include a photosensor, a motion detector, a thermometer, a particulate sensor, a radioactivity sensor, any other type of device that measures a physical quantity and converts the quantity into an electromagnetic signal, or any combination thereof. For example, the sensors 104 may measure the quantity of $O2$, $CO2$, CO, VOC (volatile organic compound), humidity, evaporated LPG (liquefied petroleum gas), NG (natural gas), radon or mold in air; measure the quantity of LPG, NG, or other fuel in a tank; and measure sound waves with a microphone and/or ultrasonic transducer.

The input devices 106 may be any device or combination of devices that receives input from a person or a device. Examples of the input devices 106 include a wall light switch, a dimmer switch, a switch for opening doors, any device that may control light fixtures 102 directly or indirectly, any device used for security purposes or for detecting an occupant, a dongle, a RFID (radio frequency identifier) card, RFID readers, badge readers, a remote control, or any other suitable input device.

The goal-based lighting controller 108 may be any device or combination of devices that may control the light fixtures 102 in the lighting system 100 based on the management goals. Examples of the goal-based lighting controller 108 may include a server computer, a desktop computer, a laptop, a cluster of general purpose computers, a dedicated hardware device, a panel controller, or any combination thereof. The goal-based lighting controller 108 may be in the physical site 118, outside of the physical site 118, such as in a parking garage, outdoor closet, in a base of a street light, in a remote data center, or any combination thereof.

The user computing device 112 may be any device that may host the GUI 114. Examples of the user computing device 112 include a desktop computer, a handheld device, a laptop computer, a tablet computer, a personal digital assistant, a mobile phone, and a server computer. The user computing device 112 may be a special purpose device dedicated to a particular software application or a general purpose device. The user computing device 112 may be in communication with the goal-based lighting controller 108 over a communications network, such as the data network 110. Alternatively or in addition, the goal-based lighting controller 108 may host the GUI 114 and the operator may interact with the goal-based lighting controller 108 directly without the use of the user computing device 112.

The graphical user interface (GUI) 114 may be any component through which people interact with software or electronic devices, such as computers, hand-held devices, portable media players, gaming devices, household appliances, office equipment, displays, or any other suitable device. The GUI 114 may include graphical elements that present information and available actions to a user. Examples of the graphical elements include text, text-based menus, text-based navigation, visual indicators other than text, graphical icons, and labels. The available actions may be performed in response to direct manipulation of the graphical elements or to any other manner of receiving information from humans. For example, the GUI 114 may receive the information from the manipulation of the graphical elements though a touch screen, a mouse, a keyboard, a microphone or any other suitable input device. More generally, the GUI 114 may be software, hardware, or a combination thereof, through which people—users—interact with a machine, device, computer program or any combination thereof.

The lighting system 100 may include any number and type of load devices. A load device may be any device that may be powered by the goal-based light controller 108, the power device, or any combination thereof. Examples of the load devices may include the light fixtures 102, the sensors 104, the user inputs 106, the switchable window 116, a ceiling fan motor, a servomotor in an HVAC (Heating, Ventilating, and Air Conditioning) system to control the flow of air in a duct, an actuator that adjusts louvers in a window or a blind, an actuator that adjusts a window shade or a shutter, devices included in other systems, thermostats, photovoltaics, solar heaters, or any other type device. Alternatively or in addition, the goal-based light controller 108, the power device, or any combination thereof, may communicate with the load devices.

The power device may be any device or combination of devices that powers one or more load devices, such as the light fixtures 102. In one example, the power device may both power and communicate with the load devices. In a second example, the power device may power the load devices while the goal-based light controller 108 may communicate with the load devices and the power device. In a third example, the goal-based light controller 108 may include the power device. In a fourth example, the goal-based light controller 108 may be in communication with the power device, where the two are separate devices.

During operation of the lighting system 100, the operator may interact with the goal-based lighting controller 108 through the GUI 114. For example, the operator may set the management goals through the GUI 114. The goal-based lighting controller 108 may control the load devices, such as the light fixtures 104, throughout the physical site 118 so as to achieve the management goals.

In one example, the goal-based lighting controller 108 may directly control the power levels delivered to load devices, receive sensor data from the sensors 104, and receive input from the input devices 106 over the data network 110. In a second example, the goal-based lighting controller 108 may communicate with the power device in order to direct the power device to control the power levels delivered to load devices, to receive sensor data from the sensors 104, and to receive input from the input devices 106.

The physical site 118 may be illuminated from light generated by the light fixtures 102 as controlled by the goal-based light controller 108. Additionally, the physical site 118 may be illuminated from natural light 120. For example, the natural light 120 may pass through wall windows 122 or skylights. Alternatively or in addition, artificial light 124 not under the control of the lighting system 100, such as light from a pre-existing system, may illuminate at least a portion of the physical site 118. Occupants 126 may live in, work in, or pass through the physical site 118. The occupants 126 may be people, animals, or any combination thereof.

In one example, the sensors 104 may be distributed throughout the physical site 118 and with a high enough concentration of the sensors 104 so that sensor data covers the entire physical site 118 or desired locations within the physical site 118. For example, the sensors 104 may be located at each one of the light fixtures 102 or in each room. The sensors 104 may detect the presence the occupants 126 throughout the physical site 118. The sensors 104 may measure site parameters that reflect measured characteristics of the physical site 118 and device parameters that reflect measured characteristics of devices, such as the load devices, or any combination thereof. Examples of site parameters may include down ambient light, side ambient light, room air temperature, plenum air temperature, humidity, carbon monoxide, or any other physical property. Examples of device parameters may include power consumption, operating temperature, and operational status.

3. Goal-Based Control.

Figure 2:
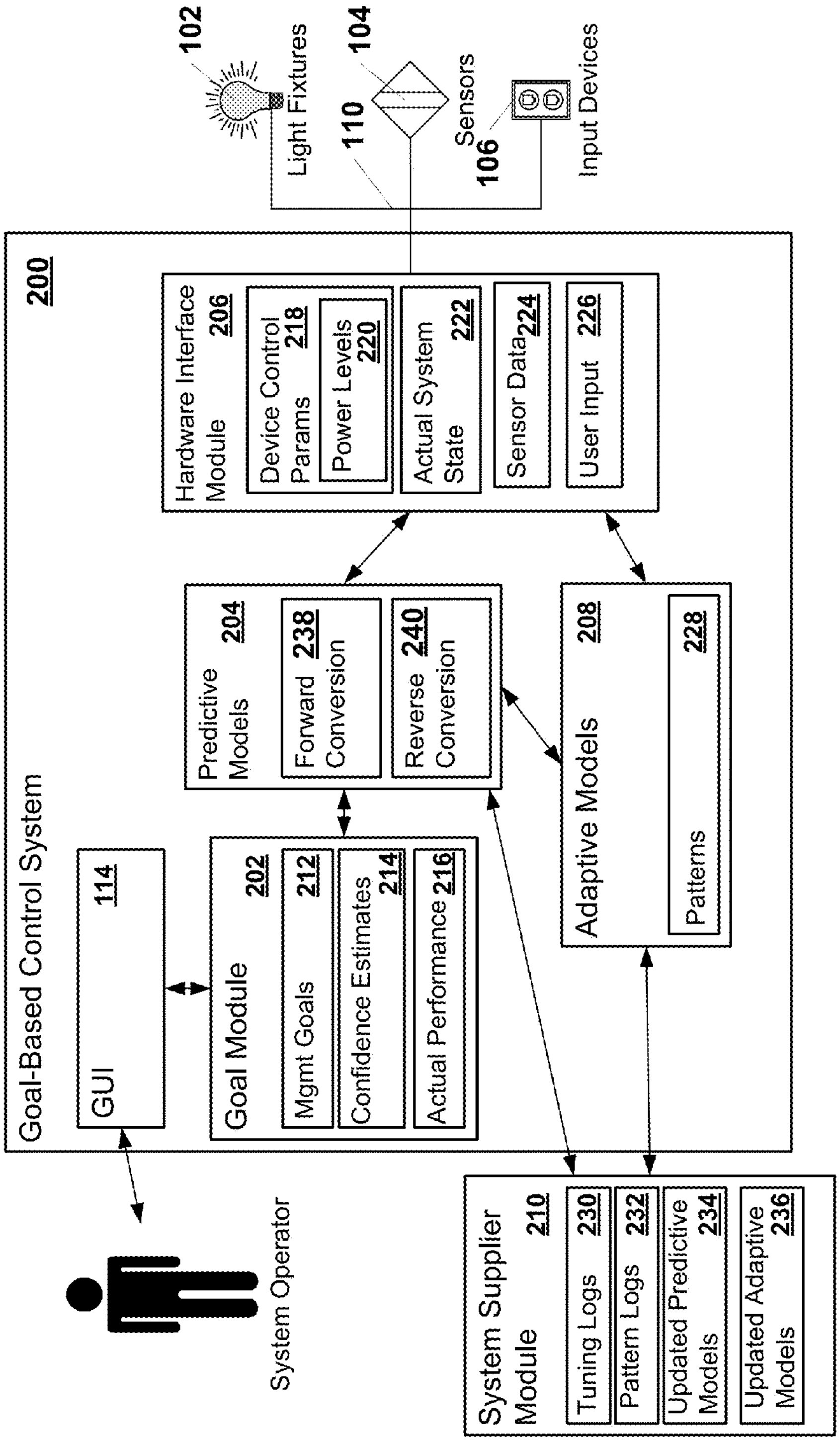
FIG. 2 illustrates an example of a goal-based control system for lighting.

FIG. 2 illustrates an example of a goal-based control system 200 for lighting. The goal-based control system 200 may include a goal module 202, predictive models 204, a hardware interface module 206, and adaptive models 208. The goal-based control system 200 may include additional, fewer, or different components. For example, the goal-based control system 200 may include a system supplier module 210 and the GUI 114.

The goal module 202 may be any component or components that receive the management goals 212 from the GUI 114. In addition, the goal module 202 may provide goal-related information to the GUI 114 for display to the operator. For example, the goal-related information may include confidence estimates 214 indicating a likelihood of satisfying the management goals 212 and actual performance 216 of the system 202 toward meeting the management goals 212.

The predictive models 204 may be any component or components that translate the management goals 212 into device control parameters 218, such as power levels 220. The predictive models 204 may determine the device control parameters 218 as a function of time, and—in at least one example—as a function of additional inputs. The predictive models 204 are predictive in nature because the predictive models 204 may determine values of the device control parameters 218 whose affect will be realized in the future, such as lamp light output and temperature, energy consumption, and life expectancy. Additionally, the predictive models 204 are predictive in nature because the predictive models 204 may predict expected sensor values.

The hardware interface module 206 may be any component or components that control the light fixtures 102 based on the device control parameters 218. The hardware interface module 206 may be in communication with the light fixtures 102 and other devices in the lighting system 100, such as the sensors 104, the input devices 106, and the power device. Actual system state 222 may include information about the state of the lighting system 100. The hardware interface module 206 may determine the actual system state 222 based on information received from the light fixtures 102 and the other devices. Alternatively or in addition, the hardware interface module 206 may determine the actual system state 222 based on sensor data 224 received from the sensors 104. Alternatively or in addition, the hardware interface module 206 may determine the actual system state 222 based on information received from the input devices 106, power consumption, and/or current settings. In one example, the hardware interface module 206 may include adapters that are each specific to a particular type of device.

The adaptive models 208 may be any component or components that determine patterns 228 from system operation information, such as the actual system state 222, the sensor data 224, and the user input 226.

The system supplier module 210 may be any component or components that update the predictive models 204, the adaptive models 208, or both. The system supplier module 210 may be in communication with the goal-based control system 200 illustrated in FIG. 2 over the Internet or over any other communications network, such as the data network 110.

The components of the goal-based control system 200, such as the goal module 202, the predictive models 204, the hardware interface module 206, the adaptive models 208, and the system supplier module 210, may be implemented entirely in software. Alternatively or in addition, the components of the goal-based control system 200 may be implemented in hardware. The components may be non-transitory computer readable media with instructions. The components may operate independently or be part of a same program. The components may be resident on separate hardware, such as separate removable circuit boards, or share common hardware, such as a same memory and processor for implementing instructions from the memory.

The components may pass information to each other using any mechanism for passing information between components now known or later discovered. Examples of such mechanisms include, but are not limited to, using programming procedure invocations, remote programming procedure invocations, SOAP (Simple Object Access Protocol) messages, and HTTP (HyperText Transport Protocol) messages, memory address pointers, or shared memory.

During operation of the goal-based control system 200, the operator may input the management goals 212 through the GUI 114. The goal module 202 may receive the management goals 212 from the GUI 114. The goal module 202 may provide the management goals 212 to the predictive models 204. The predictive models 204 may translate the management goals into the device control parameters 218. The device control parameters 218 may include any parameters that may control devices in the lighting system 100. Examples of the device control parameters 218 include the power levels 220 for the light fixtures 102 and other devices, opacity values for the switchable window 116, or any other value that controls a device. The hardware interface module 206 may communicate the device control parameters 218 to suitable devices in the lighting system 100.

The hardware interface module 206 may receive the sensor data 224 from the sensors 104. The sensor data 224 may include information related to the state of the lighting system 100. For example, the sensor data 224 may include information related to the state of the physical site 118, such as ambient light and temperature measurements or any other properties of the physical site 118. The sensor data 224 may also include information related to the state of devices in the lighting system 100, such as the power consumed by the light fixtures 102, the efficiency of the light fixtures 102, or any other property of a device in the lighting system 100. Thus, the hardware interface module 206 may determine the actual system state 222 from the sensor data 224. Alternatively or in addition, the hardware interface may receive information about the state of the devices in the lighting system 100 from the devices themselves. Thus, the hardware interface module 206 may determine the actual system state 222 based on data received from the devices in the lighting system 100. Alternatively or in addition, the hardware interface may receive information about the state of the devices or the physical site 118 from the user input 226 received from the input devices 106. Thus, the hardware interface module 206 may determine the actual system state 222 based on the user input 226.

The predictive models 204 may receive the actual system state 222 from the hardware interface module 206. Thus, a short-term control feedback loop may be formed: the predictive models 204 may transmit the device control parameters 218 to the hardware interface module 206 and receive the actual system state 222 from the hardware interface module 206. By applying control system techniques, the predictive models 206 may adjust the device control parameters 218 to limit the extent of the difference between a predicted system state and the actual system state 222.

The predictive models 204 may generate the predicted system state based on information that may be predicted accurately prior to receiving data from the operation of the lighting system 100. That which is prior to receiving data from the operation of the lighting system 100 is referred to herein as "a priori." On the other hand, the predictive models 204 may also generate the predicted system state based on information that may be predicted substantially more accurately after receiving data from the operation of the lighting system 100. That which is subsequent to receiving actual data from the operation of the lighting system 100 is referred to herein as "a posteriori."

The sensor data 224 and the user input 226 may include information about aspects of the lighting system 100 that are less amenable to a priori prediction by the predictive models 204. In one example, the input devices 106 may include wall control inputs that facilitate the ability of occupants 126 to override system operation. For example, an occupant may increase the light generated by one of the light fixtures 102 in a room to full intensity with a wall control input after the predictive models 204 determined the intensity was to be a value less than full intensity. In a second example, the sensors 104 may include motion detectors that detect the presence and location of the occupants 126 in the physical site 118. In a third example, the sensors 224 may include photosensors that detect artificial light 124 that is beyond the control of the system. The sensor data 224 and the user input 226 that include information about the lighting system 100 that are less amenable to a priori prediction by the predictive models 204 may be processed by the adaptive models 208.

The adaptive models 208 may receive the sensor data 224 and the user input 226 that are more amenable to a posteriori prediction from the hardware interface model 206. The adaptive models 208 may discover and model the patterns 228 of system activities from the data received from the hardware interface model 206 over time. For example, the adaptive models 208 may determine occupant usage, external lighting patterns, or any other suitable pattern. The adaptive models 208 may send the patterns 228 detected to the predictive models 204. Consequently, a medium-term control feedback loop is formed: the predictive models 204 may transmit the device control parameters 218 to the hardware interface module 206 over time and receive the patterns 228 of system activities from the adaptive models 208. With the patterns 228, the predictive models 204 may improve the predicted system state and thus better determine the device control parameters 218. For example, by knowing where transit corridors are located in the physical site 118, and the times when the transit corridors are most heavily used by occupants 126, the predictive models 204 may minimize the cycling of light intensity in the transit corridors. Frequent cycling may produce little or no reduction in overall power consumption, and is generally perceived by the occupants 126 as undesirable and even annoying.

In response to receiving the management goals 212, the predictive models 204 may generate the confidence estimates 214 indicating how likely the system 200 will be able to satisfy the management goals 212 over time. The confidence estimates 214 may be displayed in the GUI 114 as a real-time response to receiving the management goals 212, thereby helping to guide the operator in setting the management goals 212. The predictive models 204 may generate a priori confidence estimates 214 and a posteriori confidence estimates 214.

Alternatively or in addition, the predictive models 204 may generate an a posteriori indicator. In particular, the predictive models 204 may generate the actual performance 216 of the system 100 or 200 toward satisfying the management goals 212. The actual performance 216 may be displayed in the GUI 114 as a real-time indication of the effectiveness of the system 100 or 200 in meeting the management goals 212. Like the confidence estimates 214, the actual performance 216 may help to guide the operator in setting realistic management goals 212.

In one example, the goal-based control system 200 may generate tuning logs 230. The tuning logs 230 may include information about the effectiveness of the predictive models 204. Alternatively or in addition, the tuning logs 230 may include information about how the predictive models 204 have been tuned over time by the adaptive models 208. Alternatively or in addition, the system 100 may generate pattern logs 232. The pattern logs 232 may include information about the patterns 228 discovered by the adaptive models 208. Periodically, the goal-based control system 200 may transmit the tuning logs 230, the pattern logs 232, or any combination thereof to the system supplier module 210. The system supplier module 210 may analyze the logs 230 and 232 in order to improve a supplier model library that includes information for matching physical sites and customer system needs with corresponding predictive models 204 and adaptive models 208. The supplier model library may be used to configure new installations of goal-based control systems. Alternatively or in addition, the system supplier module 210 may update installed goal-based control systems with updated predictive models 234 and/or updated adaptive models 236. A long-term control feedback loop is thereby formed: the predictive models 204 determine device control parameters 218 over time and subsequently receive the updated predictive models 234 and/or the updated adaptive models 236.

In summary, each one of the management goals 212 may represent a dimension in a multidimensional problem space. Values in any dimension may represent possible values for the management goal 212 that corresponds to that dimension. Like any other one of the management goals 212, a sub-goal may also represent a dimension in the multidimensional problem space. The value for a high-level management goal may be determined from a combination of the values for the sub-goals of that high-level management goal. For example, the value of the high-level management goal may be determined from a mathematical vector whose elements have magnitudes determined by the values for the sub-goals of that high-level management goal. In a second example, the value of the high-level management goal may be the sum of the values for the sub-goals of that high-level management goal. In a third example, a weighting factor may be applied to each one of the values for the sub-goals. The value for any of the management goals 212 may be determined from any mechanism for combining values of the sub-goals of that management goal. The value for a sub-goal may be determined from values for sub-goals of that sub-goal.

Through a forward conversion component 238 of the predictive models 204, the goal-based control system 200 may translate the high-level management goals 212 into the low-level device control parameters 218. The system 200 may monitor performance of the system by receiving the actual system state 222 from the data network 110. Through a reverse conversion component 240 of the predictive models 204, the system 200 may translate the low-level actual system state 222 in reverse in order to determine the actual performance 216 of the lighting system 100 with respect to the management goals 212. The forward and reverse conversion components 238 and 240 may also provide the goal module 202 with a priori feedback for display in the GUI 114 for the operator. For example, the a priori feedback may include the confidence estimates 214 indicating how likely the goal-based control system 200 will satisfy the management goals 212 over the long-term.

The predictive models 204 may work in unison to balance management goals 212 that compete with each other. Competing management goals 212 may translate into competing device control parameters 218. For example the productivity goal may compete with the energy savings goal. As a result, the device control parameters 218 may also conflict. For example, the device control parameters 218, such as light output, power consumption, and longevity of the light fixtures 102, may conflict with each other.

Because the management goals 212 may conflict with each other, each one of the management goals 212 may include target ranges. The target ranges indicate that the predictive models 204 may determine the device control parameters 218 such that the actual performance 216 over time for each one of the management goals 212 will remain within the target ranges. If the management goals 212 were specified as single values such that the actual performance 216 over time for each one of the management goals 212 had to equal the single value, then the predictive models 204 may have no "wiggle room" in order to determine suitable device control parameters 218. As a result, the goal-based control system 200 may not be able to effectively balance competing goals. Thus, with the management goals 212 specified as ranges, the goal-based control system 200 may make predictions with the predictive models 204, determine appropriate tradeoffs, and determine a point in the n-dimensional space for the n number of management goals 212 that satisfies all the management goals 212. To help guide the operator in setting the management goals 212 to realistic ranges, the GUI 114 may include the confidence estimates 214 along each goal dimension. Thus, the operator may see the degree of confidence with which the system 100 is likely to achieve each one of the management goals 212. Alternatively or in addition, the GUI 114 may include an overall confidence estimate that indicates the likelihood that the complete set of the management goals will be met.

In at least one example, the goal-based control system 200 may operate without receiving the actual system state 222, the sensor data 224, the user input 226, or any other a posteriori information. Thus, the goal-based control system 200 may operate without physically being in communication with the lighting system 100. The predictive models 204 facilitate running in an "open loop" by determining, for example, the confidence estimates 214 from just the models of the lighting system 100 embodied in the predictive models 204. The more accurate the predictive models 204 and the a priori data on which the predictive models 204 are based, the greater the likelihood that the confidence estimates 214 will be correct for the actual lighting system 100.

Prior to an install, standard predictive models provided by a supplier of the goal-based control system 200 may be selected to match the needs of the customer making the install. The standard models may be developed by the supplier or other party based on predetermined high-level goals, low-level control parameters, sensor characterization, or any other suitable data. The standard models may be validated and refined through early field trials. Alternatively or in addition, the standard models may be regularly updated by the system supplier module 210 in accordance with data obtained from installed systems.

The standard models may be organized in a supplier model library according to standard customer and usage scenarios. As part of the system order or installation process, supplier representatives or installers may work with customers to customize and configure the system models. The supplier representatives or installers may analyze customer requirements and select the best match from the supplier model library. As needed, the supplier may customize the standard models copied from supplier model library. The customer, such as an architect or lighting designer, may provide system and physical site 118 information, such as facility plans, light fixture and sensor types, placement of devices, work area locations, work area boundaries, work area target light levels, and light levels for emergency and aesthetic light fixtures.

In general, the more a priori information that the customer is able to provide, the more accurate the predictive models 204 and the adaptive models 208. The more accurate the predictive models 204 and the adaptive models 208, the higher likelihood that the goal-based control system 200 will satisfy the management goals 212. The less a priori data that is provided, the more the system 200 may rely on adaptive modeling to achieve the management goals 212.

After install, the adaptive models 208 may monitor the performance of the system 200 through a posteriori data such as the sensor data 224 and user input 226. By making use of various forms of feedback from a posteriori information, the goal-based control system 200 may continuously improve both the installed goal-based control system 200 and goal-based control systems that are installed subsequent to the installed system.

If system performance fails to meet customer expectations, the operator may manually tune the system 200. At a low level, the GUI 114 may facilitate manual specification and override of the device control parameters 218. For example, the GUI 114 may facilitate setting a light level for a group of the light fixtures 102. At a higher level, the GUI 114 may provide a view of the predictive and adaptive models 204 and 208. The operator may assess the models 204 and 208 by creating what-if scenarios through the GUI 114 and playing the scenarios, offline, through the models 204 and 208.

In one example, the operator may modify tunable model parameters. A tunable model parameter may include any aspect of the predictive models 204 or the adaptive models 208 that may be modified by the operator. Examples of the tunable model parameters include: details of the physical site 118; physical locations of the light fixtures 102, the sensors 104, the input devices 106, or any other device in the lighting system 100; the type of such device; a light level for a group of the light fixtures 102, a light level in a workspace that is optimal for a particular task; or any other value that the models 204 and 208 use to predict the device control parameters 218.

Modifying the tunable model parameters may include interacting with a configurator in the GUI 114. The goal-based control system may include the configurator. The configurator may be any component or subsystem that facilitates the operator setting or adjusting the tunable model parameters. In one example, the configurator may include a component of the GUI 114 that facilitates the operator setting or adjusting the tunable model parameters. The configurator may embody the process of how to tune the predictive models 204 and/or the adaptive models 208, guide the operator in doing so, and prevent the operator from setting the tunable model parameters incorrectly. The configurator may model the process of configuring the tunable model parameters based on intimate knowledge of the tunable model parameters and the process of setting or adjusting the parameters. Thus, a relatively inexperienced operator may tune the models 204 and 208.

The configurator may be implemented using any mechanism now known or later developed for configuring data. For example, the configurator may operate as a wizard or menu that guides the operator on a tour through the configurable parts of the predictive and adaptive models 204 and 208. The tour may be made ad hoc by the operator, or directed by the system 200 to lead the operator through standard configuration scenarios. Throughout the configuration process, the system 200 may constrain values and/or choices received via the GUI 114 for any tunable model parameter. In one example, the system 200 may verify inputs received from the operator, warn of problematic inputs, and limit acceptance of inputs to validated parameters.

Aspects of the system 200 may be implemented with the aid of general purpose AI (artificial intelligence) libraries. The AI libraries may be available under an open source license or under a proprietary license. Other arrangements for availability may be used. The AI libraries may include AI features such as unsupervised learning, goal seeking, and optimization of multi-dimensional problem solutions. In particular, the goal-based control system 200 may implement the predictive and adaptive models 204 and 208 in part using one or more of the AI features.

4. Graphical User Interface.

The operator may direct operation of the goal-based control system 200 through specification of high-level management goals 212. As explained above, the system 200 may guide the operator through setting the management goals 212 by predicting future performance against the management goals 212 and by providing a priori and a posteriori feedback based on the management goals 212.

Figure 3:
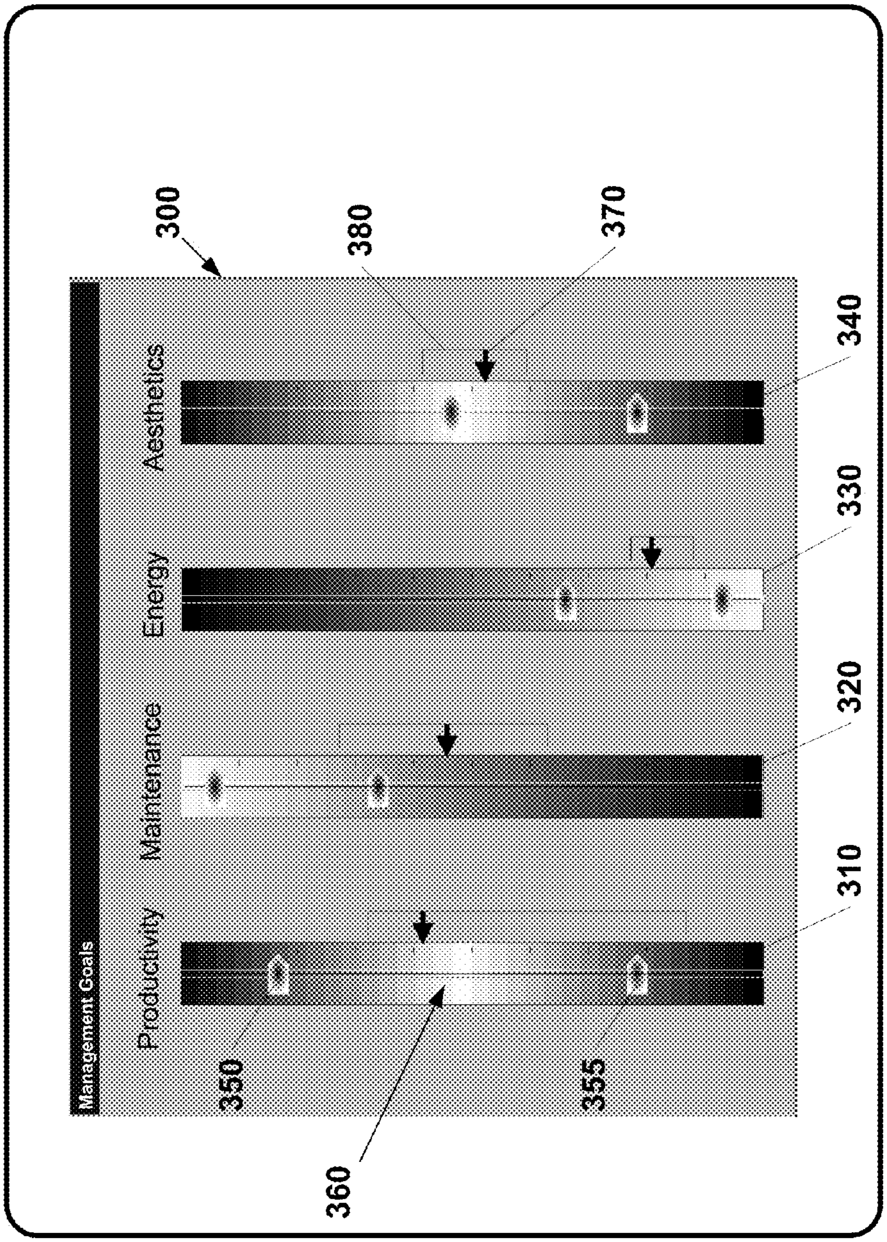
FIG. 3 illustrates an example of a management goals window.

FIG. 3 illustrates an example of a management goals window 300 in the GUI 114. In the example illustrated in FIG. 3, the management goals window 300 includes a slider control 310, 320, 330, or 340 for each of the management goals 212. For example, the management goals 212 may be the productivity goal, the maintenance goal, the energy goal, and the aesthetics goal. Each slider control 310, 320, 330, or 340 may include upper and lower adjustable slider thumbs 350 and 355 that together identify an acceptable range of the values for the management goal corresponding to the slider control. Alternatively, each slider control 310, 320, 330, or 340 may include a single adjustable slider thumb. The upper adjustable slider thumb 350 may indicate a maximum value in the range, and the lower adjustable slider thumb 355 may indicate a minimum value in the range. Alternatively, the management goals window 300 may include any control or combination of controls for setting a value or range of values, such as a numeric field corresponding to a maximum value and a numeric field corresponding to a minimum value.

The management goals window 300 may include a visual indication of a priori feedback. For example, the confidence estimates 214 may be indicated by icon size, background intensity shading 360, color hue, or any other visual indicator on or adjacent to each slider control 310, 320, 330, or 340. For example, the lighter the background intensity shading 360, the more likely that the value of the management goal 212 will be satisfied over time given the settings of the other management goals 212. The confidence estimate 214 for a particular value of a particular one of the management goals 212 may be based on the settings of the other management goals 212 and any other factors that affect an ability to satisfy the particular goal. For example, with the settings of the management goals 212 being held constant, if the cost of energy suddenly goes up, then the confidence of meeting a particular energy cost goal value will change. The background intensity shading 360 may be set for each possible value of the management goal 212. Alternatively or in addition, the confidence estimates 214 may be expressed as a percentage value next to each one of the slider controls 310, 320, 330, or 340.

Alternatively or in addition, the management goals window 300 may include a visual indication of a posteriori feedback. For example, the actual performance 216 of the lighting system 100 may be displayed next to each slider control 310, 320, 330, or 340. For example, the current actual performance 216 toward each one of the management goals 212 may be indicated by an arrow 370 pointing to a position of the corresponding slider control 310, 320, 330, or 340. The position pointed to by the arrow 370 may indicate a particular value of the management goal at which the system 100 is currently operating. Alternatively or in addition, a history of the actual performance 216 over a predetermined time period may be indicated, for example, with a bracket 380. The ends of the bracket 380 may extend over the range of values of the actual performance 216. Stated differently, the ends of the bracket 380 may correspond to high and low "water marks" for each of the management goals 212.

During the operation of the management goals window 300, the operator may specify acceptable ranges of operation of the lighting system 200 for each one of the management goals 212. For example, the operator may adjust the adjustable slider thumbs 350 and 355 of the slider controls 310, 320, 330, and 340 so that the settings for the management goals 212 match settings desired by the operator and so that the management goals are likely to be satisfied. The visual indicator 360 of the confidence estimates 214, the visual indicators 370 and 380 of the actual performance 216, or both, may indicate to the operator whether the management goals 212 are likely to be satisfied.

If the settings desired by the operator are unlikely to be satisfied, the operator may move the adjustable slider thumbs 350 and 355 of the slider controls 310, 320, 330, and 340 so that the settings for the management goals 212 are likely to be satisfied. When re-adjusting the adjustable slider thumbs 350 and 355 of the slider controls 310, 320, 330, and 340, the operator may decide which of the management goals 212 should be relaxed in order for the management goals 212 to be satisfied. In response to moving the adjustable slider thumbs 350 and 355 of the slider controls 310, 320, 330, and 340, the visual indicators 360, 370, and 380 of the confidence estimates 214 and the actual performance 216 may be updated in real-time.

For example, the operator may slide the lower slider thumb 355 down the slider control 330 corresponding to the energy consumption goal, thereby expanding the energy goal range to include lower values. In one example, sliding the second slider thumb 355 down the slider control 330 may indicate that the goal-based control system 200 is to bias operation of the lighting system 100 towards a lower level of energy consumption, while indicating that operation at the upper limit of the range of energy consumption, as indicated by the upper slider thumb 350, is still acceptable. In response to sliding the lower slider thumb 355 down the slider control 330, the system 200 may predict how the range change of the energy goal affects the confidence estimates 214 along the other goal dimensions. For example, if the energy goal corresponds to energy consumption, the confidence estimate 214 for satisfying the productivity goal may fall due to the bias toward the lower energy consumption. For example, less energy consumption may result in lower light levels and more annoying lighting effects, such as increased light level fluctuations. In contrast, the confidence estimate 214 for satisfying the maintenance goal may increase because lower power consumption may result in longer lamp life and lower replacement costs.

In addition to sliding the lower slider thumb 355, the operator may slide the upper slider thumb 350 down the slider control 330 corresponding to the energy goal, thereby shrinking the energy goal range to lower the acceptable values for energy. If the energy goal corresponds to energy consumption, sliding the upper slider thumb 350 down the slider control 330 may indicate that the goal-based control system 200 is to bias operation of the lighting system 100 towards a lower level of energy consumption while decreasing the upper limit of the range of energy consumption that is acceptable. The goal-based control system 200 may accordingly update the confidence estimates 214 along the goal dimensions, probably with greater affect than in response to sliding the second slider thumb 355 because the constraint is more severe.

To further assist the operator, the goal-based control system 200 may detect "critical" goals. A critical goal may be any goal that warrants operator attention. For example, the critical goal may be a goal that has a corresponding confidence estimate 214 that is below a predetermined threshold. Alternatively or in addition, the critical goal may be a goal that is overly constrained and/or will have the greatest affect on fixing an overly constrained system. The nature and degree of criticality of the critical goal may be indicated by changing a color, such as changing a green border to red, by temporal effects, such as flashing at a particular rate, by playing a sound, changing the prominence of the goal, such as by displaying the critical goal in a dialog box or selecting a tab in a tabbed window, any other technique for bringing attention to a visual element in the GUI 114, or any combination thereof.

The operator may resolve the criticality of the goal by relaxing the range limit for one or more of the critical goal dimensions. For example, the operator may slide the goal range, as a whole, to an area with a higher confidence estimate 214, or modify one or both range limits to bias and relax the goal range. In either case, the lighting system 100 may be more likely to achieve the critical goal, thus potentially changing the status of the goal from being the critical goal to a non-critical goal.

The GUI 114 may provide a more detailed view of the lighting system 100. For example, sub-goals of the management goals 212 may be presented in a manner similar to that used for the top-level management goals 212.

Figure 4:
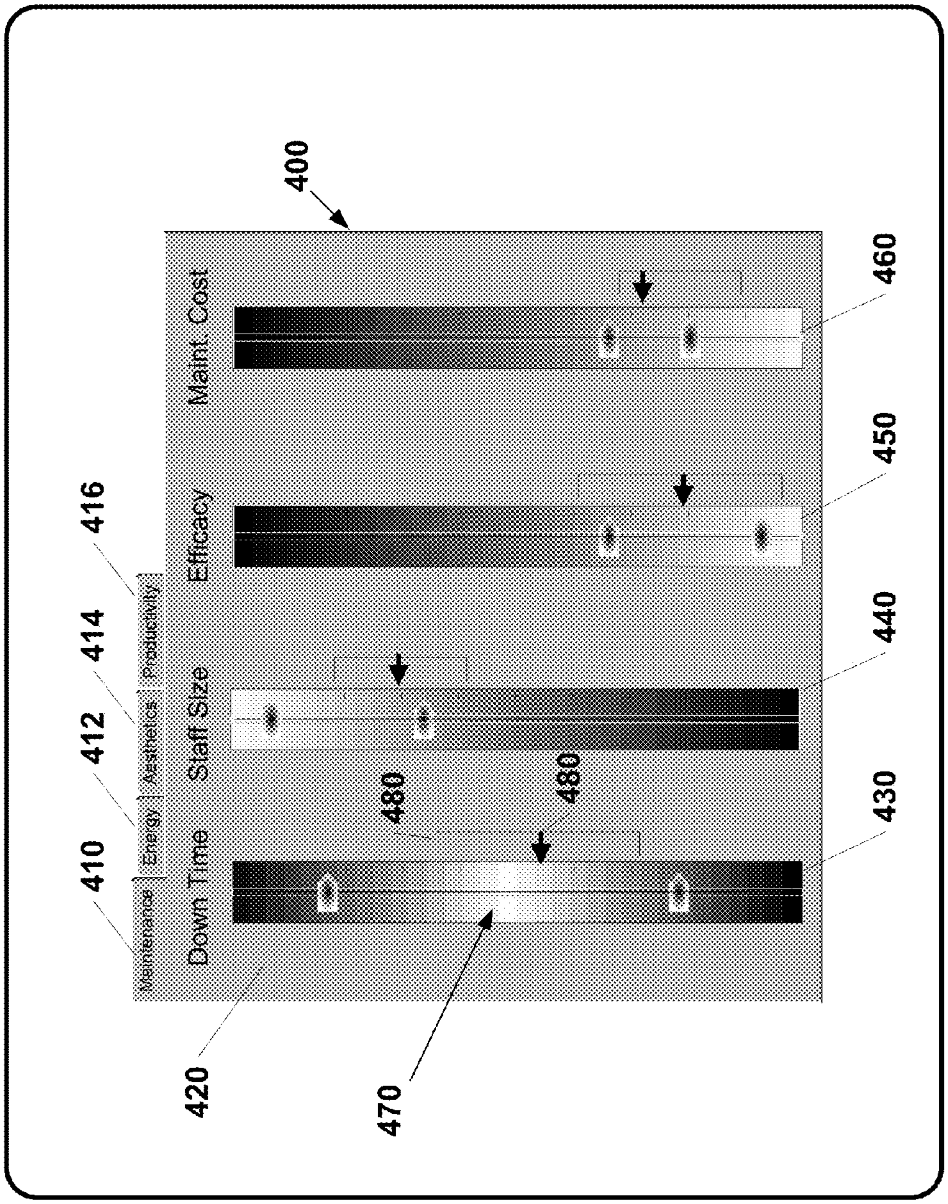
FIG. 4 illustrates an example of a sub-goals window for sub-goals.

FIG. 4 illustrates an example of a sub-goals window 400 in the GUI 114 for sub-goals of the management goals 212. The sub-goals window 400 may be a tabbed window, where the tabs 410, 412, 414, and 416 correspond to the high-level management goals 212. Other display formats may be used. When any of the tabs 410, 412, 414, and 416 is selected, a corresponding panel 420 is displayed in the window 400. The panel 420 may include slider controls 430, 440, 450, and 460 that correspond to the sub-goals of the high-level management goal of the selected tab 410. For example in FIG. 4, the selected tab 410 corresponds to the high-level maintenance goal. The panel 420 includes slider controls 430, 440, 450, and 460 for each one of the sub-goals of the maintenance goal: down time, staff size, efficacy, and maintenance cost. The sub-goals window 400 may include visual indicators 470, 480, and 490 of the confidence estimates 214 and the actual performance 216 as applied to the sub-goals of the selected high-level management goal.

The windows 300 and 400 that display and modify high-level management goals 212 and sub-goals may provide a convenient view of the operation of the lighting system 100. Alternatively or in addition, the GUI 114 may include windows that display and modify cross-cutting business metrics. Cross-cutting business metrics may be aspects of the system that may be orthogonal to and on par with the high-level management goals 212 described above. Thus, the cross-cutting business metrics may provide yet a different view of the operation of the lighting system 100 by “cutting across” the management goals 212. Cross-cutting metrics may combine and sort information about the management goals 212 in a manner that spans the high-level management goals 212. For example, a measure of business cost may be identified for each of the other high-level management goals 212, such as productivity, maintenance, and energy. Alternatively or in addition, cross-cutting goals may combine and present such measures as separate sub-goals. Examples of cross-cutting business metrics include costs, savings, return on investment (ROI), and environmental impact. The cross-cutting business metrics may be orthogonal to the high-level management goals 212 in that the cross-cutting business metrics may be considered separately from the high-level management goals 212. Because “high-level” and “cross-cutting” are relative terms, the system 200 may present quantitative cross-cutting business metrics as high-level goals, and qualitative metrics such as productivity, energy, maintenance, and aesthetics, as cross-cutting sub-goals.

Figure 5:
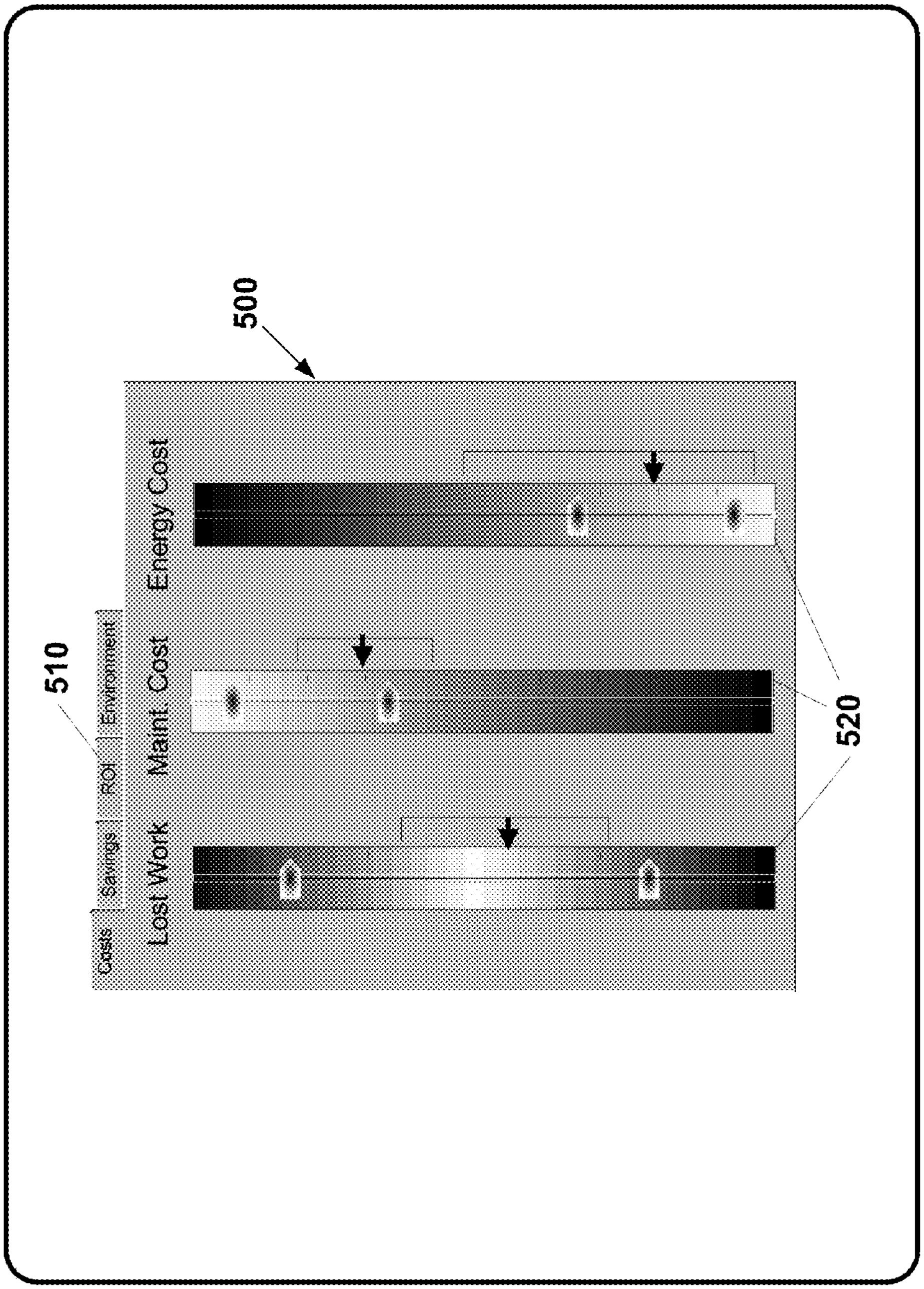
FIG. 5 illustrates an example of a cross-cutting business metric window.

FIG. 5 illustrates an example of a cross-cutting business metric window 500 in the GUI 114. The cross-cutting business metric window 500 may look and operate like the sub-goals window 400. For example, each of the tabs 510 may correspond to one of the high-level cross-cutting business metrics. When one of the cross-cutting business metric tabs 510 is selected, the corresponding panel may include slider controls 520 for each one of the sub-goals that is applicable to the selected cross-cutting business metric. For example, the sub-goals applicable to the costs cross-cutting business metric may include lost work, maintenance costs, energy costs, or any other sub-goal applicable to business costs.

During operation, the sub-goals window 400 and the cross-cutting business metric window 500 may behave similarly to the management goals window 300. Like the high-level management goals 212, the sub-goals and cross-cutting business metrics are included in the management goals 212. As ranges for any of these management goals 212 are moved, widened, and narrowed, the goal-based control system 200 may update the confidence estimates 214 that the management goals 212 will be satisfied. A subset of the management goals 212 may be more or less sensitive to range changes than other management goals 212. In general, the more constraints placed on the management goals 212, the less likely the goal-based control system 200 will be able satisfy all of the management goals 212. Accordingly, the confidence estimates 214 may drop in response to increasing constraints on the management goals 212. In other words, constraining the system 100 to operate over a narrow range in each goal dimension may mean that the lighting system 100 may not be able to physically achieve all of the management goals 212. Therefore, the operator may prioritize the management goals 212 by tightly constraining the highest priority management goals 212, and relaxing the lower priority management goals 212. Alternatively, the goals may be prioritized automatically, such as by adjusting one or more goals with lower priority automatically in response to the user changing a goal setting.

Thus, the goal-based control system 200 may facilitate managing the lighting system 100 in a top-down approach by setting top-level goals and seeing the effect on sub-goals. Alternatively or in addition, the goal-based control system 200 may facilitate managing the lighting system 100 in a bottom-up approach by setting sub-goals and seeing the effect on top-level goals.

In one example, the goal-based control system 200 may not prevent the operator from specifying the management goals 212 at any level or range. If the system 200 is unable to satisfy all the goals, the system 200 may attempt to best meet all of the goals. In a second example, a subset of a goal dimension may be blocked off. For example, the lower 25 percent of the productivity range may be blocked off by the operator to indicate to the system 200 that the system shall not select device control parameters that result in the productivity falling in the lower 25 percent, regardless of the acceptable range included in productivity goal. Thus, specification and performance of system operation may be robust and forgiving.

5. Predictive Models.

As described above, the predictive models 204 may translate the management goals 212, determine the actual performance 216 of the lighting system 100, predict the performance of the lighting system 100 in the future, determine the confidence estimates 214 based on the prediction of future performance, and/or balance competing management goals.

The predictive models 204 may be divided into sub-models that may interact with each other. The purpose of sub-models is to decompose abstract high-level models, such as models for productivity and maintenance, into more concrete, lower-level models, such as task lighting prediction and light fixture longevity prediction. Thus, modeling more abstract aspects of the lighting system 100 may be simplified by modeling smaller, more specialized aspects of the lighting system 100 and combining the result.

Figure 6:
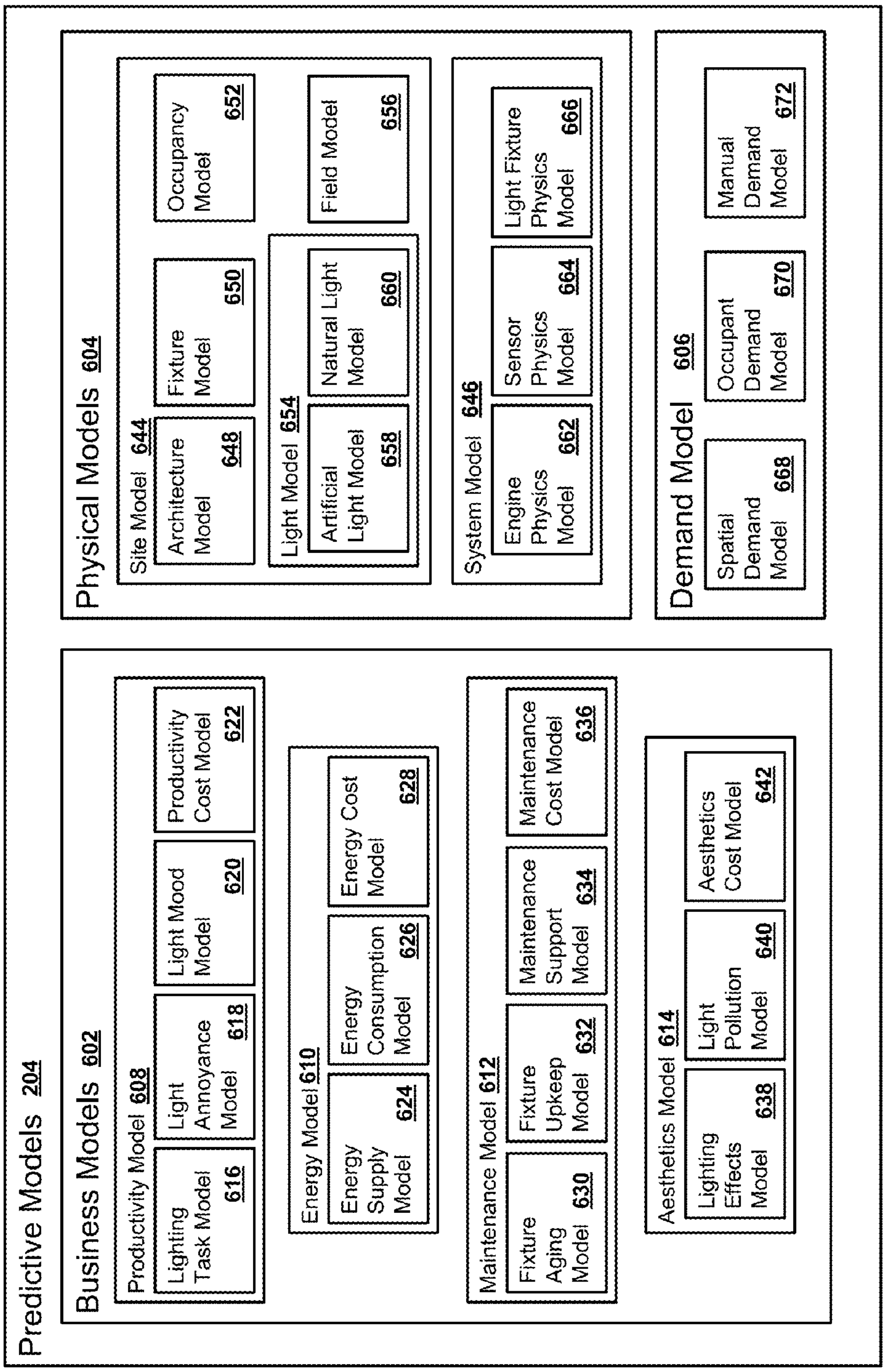
FIG. 6 illustrates examples of predictive models.

FIG. 6 illustrates examples of the predictive models 204. For example, the predictive models 204 may include abstract business models 602, concrete physical models 604, and logical demand models 606. The business models 602 may model business activity that corresponds to the management goals 212. The physical models 604 may model physical aspects of the lighting system 100, such as aspects of devices in the lighting system 100 and aspects of the physical site 118. The demand model 606 may determine an optimum solution for the device control parameters 218 from lighting demands determined by the business models 602 and the physical models 604.

The business models 602 may include models for each one of the management goals 212. In the example illustrated in FIG. 6, the business models 602 include a productivity model 608, an energy model 610, a maintenance model 612, and an aesthetics model 614, which correspond to the productivity goal, the energy goal, the maintenance goal, and the aesthetics goal, respectively. The business models 602 may include additional, fewer, or different models.

The productivity model 608 may include a lighting task model 616, a light annoyance model 618, a light mood model 620, and a productivity cost model 622. The productivity model 608 may include additional, fewer, or different models. The sub-models of the productivity model 608 may correspond to sub-goals of the productivity goal.

The energy model 610 may include an energy supply model 624, an energy consumption model 626, and an energy cost model 628. The energy model 610 may include additional, fewer, or different models. The sub-models of the energy model 610 may correspond to sub-goals of the energy goal.

The maintenance model 612 may include a fixture aging model 630, a fixture upkeep model 632, a maintenance support model 634 and a maintenance cost model 636. The maintenance model 612 may include additional, fewer, or different models. The sub-goals of the maintenance model 612 may correspond to the sub-goals of the maintenance goal.

The aesthetics model 614 may include a lighting effects model 638, a light pollution model 640, and an aesthetics cost model 642. The aesthetics model 614 may include additional, fewer, or different models. The sub-goals of the aesthetics model 614 may correspond to the sub-goals of the aesthetics goal.

The physical models 604 may include a site model 644 and a system model 646. The physical models 604 may include additional, fewer, or different models. The site model 644 may include an architecture model 648, a fixture model 650, an occupancy model 652, a light model 654, and a field model 656. The light model 654 may include an artificial light model 658 and a natural light model 660. The system model 646 may include an engine physics model 662, a sensor physics model 664, and a light fixture physics model 666. The site model 644, the light model 654, and the system model 646 may include additional, fewer, or different models.

The demand model 606 may include a spatial demand model 668, an occupant demand model 670, and a manual demand model 672. The demand model 606 may include additional, fewer, or different models.

The business models 602 may embody abstract ideas and concepts, such as productivity mood lighting and the aesthetic effects of lighting, as cost and/or reward functions, with measurable inputs, outputs, and state. As a result of the business models 602 expressing the abstract concepts numerically through cost and reward metrics, the system 200 may identify, via the demand model 606, conflicting management goals and determine optimal solutions or solutions from reasonable compromises based on the specified management goals 212. In general, the business models 602 may depend on the physical models 604—for example, the architecture model 648—which may provide a spatial reference for objects in the business models 602.

The productivity model 608 may associate cost and reward factors with various aspects of the lighting system 100 that may impact the productivity of the occupants 126. The system supplier or system installer, possibly in conjunction with the architect/designer, may identify the productivity cost and reward factors in the context of the site models 644.

The lighting task model 616 may include target light levels for each applicable work space, work surface, corridor, stairwell, emergency light, sign, or any other lighting area that may be controlled by the lighting system. The light annoyance model 618 may include factors that detract from productivity, such as glare, color rendering, frequent changes in light intensity, occupancy detection and tracking failures, or any other light-related annoyance. The light mood model 620 may include mood-related factors, such as lighting intensity, color, temporal effects, or any other factors that may affect human mood. In one example, the light mood model 620 may be a standard library selected from the supplier model library. The productivity cost model 622 may determine the productivity value by associating costs and rewards to the positive and negative factors affecting productivity.

Energy may be one of the major components of the cost of operating the lighting system 100. The energy model 610 may associate cost and reward factors with aspects of the physical site 118 and the lighting system 100 that may impact the energy provided to and used by the system 100.

The energy supply model 624 may predict the cost of energy from an energy supplier. The cost of energy may be determined as a function of time of day, day of year, level of consumption, the source of the energy, or any combination thereof. The energy supply model 624 may account for long-term rates and discounts, as well as short-term demand response constraints and incentives. The source of the energy may vary. For example, the energy source may include one or more on-site energy supplies, such as co-generation and solar panels. The energy supply model 624 may model each type of energy source. The device control parameters 218 may include an energy source selector that determines which energy supply to select. Thus, the goal-based control system 200 may select a suitable energy source based on the management goals 212.

The energy consumption model 626 may use the light fixture physics model 666 to predict how much power may be needed in order to satisfy the target task light levels in the productivity model 608 and the lighting effects model 638 in the aesthetics model 614 as a function of energy consumption, efficacy, and age of the light fixtures 102.

The energy cost model 628 may combine the outputs from the energy consumption and the supply models 624 and 626 to form a complete model of the energy cost.

Maintenance may be one of the major components of the cost of operating the lighting system 100. The maintenance model 612 may determine a value for maintenance by assigning cost and reward factors with aspects of the physical site 118 and the lighting system 100 that may involve the upkeep of the system 100.

The fixture aging model 630 may model overall longevity and degradation of a fixture over time. The fixture aging model 630 applies to light fixtures 102, but may also apply to other devices, such as the sensors 104. The sensors 104 and other devices may also degrade over time and need to be replaced. The light fixture and sensor physics model 666 and 664 may provide input regarding basic aging of the light fixtures 102 and the sensors 104 independent of site factors, whereas the fixture aging model 630 may include site-induced degradations, such as the reduction of light output from light fixture lamps and reflectors over time and reduced sensor sensitivity over time due to an accumulation of particles, such as dust, aerosols, grease, smoke, and salt spray. For example, the light fixtures 102 may be modeled to produce less light over time at a particular power level due to the accumulation of particles, such as dirt. Alternatively or in addition, the fixture aging model 630 may include the effects of other factors, such as location and orientation in or around the physical site 118, environmental conditions at that location, and time since a the fixture was last cleaned or replaced.

The fixture upkeep model 632 may combine fixture longevity and degradation predictions from the fixture aging model 630, with requirements for fixture access and maintenance in order to form a total maintenance model of each system fixture, with or without cost considerations. For example, the fixture upkeep model 632 may Include factors such as the nature of the location (for example, a standard height ceiling versus a 100 foot atrium), the number and types of fixtures at the location (for example, consider the ability to maintain more than one fixture at one time due to the co-location of the fixtures), the equipment needed to access the fixtures (for example, a step ladder versus a lift bucket), and the time estimates for performing maintenance tasks (for example, the amount of time to perform a lamp replacement, a fixture cleaning, a fixture replacement, or any other task).

The maintenance support model 634 may model aspects of system maintenance that may be considered “overhead.” For example, the maintenance support model 634 may include factors such as staffing, labor, equipment, and quantities and costs of components involved in system maintenance. In one example, the maintenance support model 634 may predict staff, labor, equipment, and inventory requirements and costs. The maintenance support model 634 may make the prediction based on outputs from the fixture upkeep model 632 and business information obtained from other sources, such as the supplier model library and the experience of subject matter experts. The maintenance support model 634 may include sub-models for lost productivity due to down time during maintenance. In one example, the maintenance support model 634 may be implemented using AI planning and knowledge representation techniques, such as an expert system, adapted for the purpose of modeling maintenance overhead.

The maintenance cost model 636 may model the total maintenance cost. The output of the fixture upkeep model 632 and the maintenance support model 634 may be inputs to the maintenance cost model 636

The aesthetic model 614 may model the aesthetic perception of the physical site 118. The aesthetic model 614 may associate cost and reward factors with aspects of the physical site 118 and lighting system 100 that may relate to the aesthetic perception of the physical site 118 and the impact of the physical site 118 on occupants 126 and surroundings. The aesthetic model 614 may apply to lighting of interior and exterior aspects of the physical site 118 that are associated with prominent architectural features, such as columns, arches, domes, fountains, and driveways, and spaces, such as lobbies, atriums, conference rooms, and auditoriums. The assessment of cost and reward is inherently subjective, but architectural projects generally include aesthetic inputs from a customer to an architect/lighting designer, which the architect/designer translates into architectural and lighting features based on design conventions and personal experience.

The lighting effects model 638 may model characteristics and constraints on lighting of aesthetic features. In one example, a system supplier or system installer, in conjunction with an architect or designer, may identify aesthetic features in the context of the architecture model 648 and the fixture model 650. In a second example, the aesthetic features may be identified with the help of the supplier model library. The aesthetic features, together with characteristics and constraints on associated lighting effects, such Intensity range, color, and ambient operating conditions, are captured in the lighting effects model 638.

The light pollution model 640 may include negative factors that adversely affect lighting of aesthetic features. Examples of the negative factors include bird migration seasons and astronomical observatory restrictions, which may impact outdoor lighting effects and, in some examples, indoor lighting effects.

The aesthetics cost model 642 may model an overall aesthetic value for lighting by assigning costs and rewards to the lighting effects. The lighting effects model 638 and the light pollution model 640 may be inputs to the aesthetic cost model 642. In other words, aesthetic effects from the lighting effects model 638 may be modeled as pluses, whereas environmental impacts from the light pollution model 640 may be negatives. The aesthetics cost model may combine the inputs into a complete model of aesthetic costs.

The physical models 604 may estimate the current state of the system 100, and predict the effects of the business models 602 and demand model 606 proposals. In other words, the physical models 604 may receive inputs from the business models 602 and the demand model 606. Alternatively or in addition, the business models 602 and the demand model 606 may receive input from the physical models 602.

The site model 644 may model the static architecture and dynamic physics of the physical site 118 and the lighting system 100. The architecture model 648 may include architectural data for locations, such as work spaces, work surfaces, transit corridors, and common areas, as well as the location and size of architectural features such as partitions, walls, doors, windows, vents, and work areas and surfaces. The fixture model 650 may include architectural data about devices in the lighting system 100, such as the location and orientation of the light fixtures 102, the sensors 104, and the user inputs 106.

The light model 654 may capture architectural characteristics specific to light, such as the reflectivity of walls, floors, ceilings, and work surfaces. The total light model 654 may combine the architectural characteristics specific to light with the artificial light model 658 and the natural light model 660 to form a complete model of illumination in the physical site 118.

The natural light model 660 may augment the architecture model 648 with specific information that affects natural light entry (for example, windows, skylights, and light pipes) and moderation (for example, blinds, shades, and awnings). The natural light model 660 may include sub-models for direct and indirect natural light sources as a function of geographic location, time of day, day or year, and historical weather data. For example sunlight may be from a direct natural light source and indirect natural light may enter a skylight.

The artificial light model 658 may augment the fixture model 650 with information about artificial light generation by the light fixtures 102 and by other light sources that are not controlled by the lighting system 100. The artificial light model 658 may include sub-models specific to purpose, such as models for task, transit, safety, and aesthetic lighting. Alternatively or in addition, the artificial light model 658 may include sub-models specific to purpose, such as models for task, transit, safety, and aesthetic lighting, and location, such as closed, open, and special purpose spaces.

As described above, the light model 654 may predict and combine natural and artificial light sources to form a complete model of illumination in the physical site 118. The information in the light model 654 may be combined with illumination requirements from the business models 602, such as illumination requirements for productivity and aesthetic effect from the productivity and aesthetic models 608 and 614, respectively. The combination may indicate how much system controlled artificial light or natural light the lighting system 100 may need to generate or allow to enter the site, and where. Therefore, the light model 654, as a whole, may predict illumination levels throughout the physical site 118 using light modeling techniques applied to outputs from the business models 602.

One example of a light modeling technique is that incident illumination is additive. The total light incident on a surface is a sum of the light from all sources received by the surface, whether natural or artificial. For each applicable target surface in the physical site 118, such as a work area, a transit corridor, and an architectural surface, the light model 654 may perform the following calculations. The light model 654 may predict and compute the contributions from each natural and artificial light source. Because of transmittance and reflectance, computing the contributions may be implemented with iterative techniques, for example, in order to arrive at a solution of sufficient accuracy. The values from the light sources may summed to produce a single predicted incident light value for each target surface. In one example, determining the single predicted incident light value may be applied at smaller and larger scales. For example, the light model 654 may sub-divide larger surfaces into smaller patches, determine the incident light on the smaller patches and, then aggregate the results in order to determine the incident light reflected from the larger surfaces, such as walls and ceilings.

Due to practical considerations, such as system equipment costs, installation costs, and logistical constraints, sensor coverage may be limited and in less than ideal locations. For example, light sensors may be in a ceiling instead of on a work surface. Similarly, illumination coverage from the light fixtures 102 may be limited, irregular, and sub-optimal due to placement or position. In one example, exhaustive physics-based lighting predictions by the light model 654 may be prohibitive. The field model 656 may compensate for such issues and determine point predictions by interpolating values between, and extrapolating values beyond actual light source and sensor coverage.

For data generated or sensed as a continuous field, such as light and air temperature, geometric modeling of the physical site 118 and modeling of physics-based processes facilitate spatially interpolating and extrapolating field values using conventional mathematical techniques. Spatial interpolation may involve, for example, the computation of an average value of neighboring samples, as weighted by the distance of the samples from a given point in space. The closer the samples are together, the higher the degree of confidence in an interpolated sample value. Spatial interpolation is complemented by spatial extrapolation, where a similar process may be used to determine trends in neighboring samples, such as through curve fitting. The trends may form a basis for predicting sample values at positions beyond the sample coverage.

The field model 656 may improve upon the performance of conventional interpolation and extrapolation techniques by incorporating geometric constraints placed on the value fields by the physical site 118. Such constraints may introduce nonlinear and discontinuous effects into the problem. The architecture model 648 may provide information on the constraints, such as the placement and size of partitions, walls, doorways, and vents. As discussed in more detail below, the field model 656 may further improve performance by incorporating the patterns 228 provided by the adaptive models 208.

The occupancy model 652 may model occupancy per location in the physical site 118. For data sensed as events, such as motion data in the sensor data 224 and manual control inputs in the user input 226, the occupancy model 652 may employ conventional and enhanced detection and tracking models to determine the presence and movement of occupants 126 in the physical site 118. Such modeling may also compensate for sensor deficiencies.

For practical reasons, motion sensing may be implemented with a sparse network of imprecise sensors. Coverage may be limited both in number and field of view, such as coverage of areas hidden by walls, doors, partitions, or other obstructions. Cost effective sensors, such as passive infrared (PIR) sensors, may only detect motion as a function of subtended angle and speed of motion. Motion detection itself may be limited in that an event only indicates that motion occurred somewhere in the field of view of the sensor without reporting information about the distance, direction, or location of the target. Detection sensitivity may be a function of target speed and distance from the sensor 104. In one example of a motion detector, a target that is far away must be larger, and move faster and farther, than one that is closer to the sensor for the same degree of detection.

The occupancy model 652 may rely on conventional or enhanced target detection and tracking techniques. The occupancy model 652 may integrate and interpret the sensor data 224 from multiple neighboring sensors 104 over space and time. From the sensor data 224, the occupancy model 652 may propose target candidates and an estimate of the dynamic state of the target candidates. The estimate of the dynamic state may be enhanced through models of the targets themselves, such as people or animals, based on factors such as maximum speed and likely changes in direction. The occupancy model 652 may assign confidence factors to the targets and the states of the targets. Over time, with subsequent received sensor data 224, the confidence in the state of the target may be reinforced or eroded. When a threshold is reached, in one direction or the other, the presence of the target is confirmed or eliminated.

The occupancy model 652 may improve upon the performance of conventional techniques by correlating target proposals with site geometry, obtained from the architecture model 648. The occupants 126 may be constrained to certain locations and types of movement by site geometry. For example, the occupants 126 may be unable to walk through walls or may be expected to transit through doors, corridors, and stairs, and to be conveyed by elevators and escalators. Site geometry also facilitates prediction of inter-visibility between the sensors 104 and targets. Thus, the occupancy model 652 may monitor the timing of both the motion indicated in the sensor data 224 and events indicated in the user input 226 across the data network 110, correlate the timing information with the site architecture, and determine the most likely location of the occupants 126. The occupancy model 652 may also predict the most likely route of the occupants through that location.

The fixture model 650 may supplement the architecture model 648 by modeling the placement of the input devices 106 in the physical site 118. Unlike motion detectors, which are rather imprecise, when an input device such as a wall control receives an input, the occupancy model 652 may assume, with near certainty, the presence and location of an occupant in the physical site 118. The occupancy model 652 may further improve performance by incorporating occupant usage patterns provided in the patterns 228 received from the adaptive models 208.

The system model 646 may model the static and dynamic physics of devices in the lighting system 100 that may affect the business goals. For example, the physics of the devices may influence power, light, and heat, which may affect the business goals.

The engine physics model 662 may model each goal-based lighting controller 108 or power device in the lighting system 100. The engine physics model 662 may include power, thermal, and longevity sub-models based on device characterization and historical data. For example, the power predictions may be based at least in part on the power levels 220 for the light fixtures 102 that are powered by the goal-based lighting controller 108 or power device. The engine physics model 662 may thereby determine a total power consumption value, which may be an input to the energy consumption model 626. The total power consumption for the device may be an input to the thermal sub-model of the device. Power and thermal predictions, together with operating time to date, may be inputs to the longevity sub-model of the device.

The light fixture physics model 666 may model each of the light fixtures 102 in the lighting system 100. The light fixture physics model 666 may include a model for each type of light fixture. The model for each type of fixture may include light, power, thermal, and longevity sub-models based on device characterization and historical data. The power sub-model may determine power predictions based on the power level 220 for the particular light fixture 102. The power predictions may be input to the energy consumption model 626 and to the thermal sub-model of the light fixture 102. Lamp drive may be at least a portion of the power level 220 for the light fixture, minus inefficiencies in the light fixture electronics. The thermal sub-model may determine thermal predictions based on the power level 220 for the light fixture 102 and on the efficiency of the light fixture electronics The light sub-model may predict light intensity, quantity, color, or any combination thereof, based on lamp drive, and, depending on the lamp technology, also lamp temperature. With solid state lighting, efficacy may drop off sharply as lamp temperature rises. The lamp may include one or more segments that may be individually driven, with each segment possibly producing a different spectral output. The light output from the light fixture may be a combination of lamp output and the optical characteristics of the light fixture reflector and lens, and is a function of relative viewing angle.

The sensor physics model 664 may model the sensors 104 in the lighting system 100. The sensor physics model 664 may include a sensor model for each type of sensor 104. Each sensor model may include power and longevity sub-models, as well as a sub-model for the unique physical quantity being sensed, such as light, power, heat, or motion. The sub-models may be based on device characterization and historical data.

The system model 646 may include a device physics model that may model any other devices in the lighting system 100, such as the input 106 devices, the switchable window 116, or any other suitable device. The device physics model may include a sub-model for each type of device. Each sub-model may include power, thermal, and longevity models, The physical models 604, especially the architecture model 648 or other site models 644, may not be easily generalized. Instead, a set of models may be configured for each installation of the lighting system 100 that captures the unique architecture and system topology of the installation. The physical models 604 may be derived from architectural and lighting designer plans. The designer plans may be provided electronically, such as in an industry standard CAD file format. The physical models 604 may be updated and verified through on-site measurements and system component identification.

The designer plans may not include information such as light fixture characteristics, architecture surface material, and light reflectance and transmittance values. In one example, the information may be added to the designer plans by an installer via CAD (computer-aided design) application extensions provided by the system supplier, or added by the installer using standalone or web-based tools to edit the predictive models 204. Alternatively or in addition, the natural light model 660 may be imported from daylight models produced by common industry software, such as the ADELINE open source daylight modeling application, or the Kalwell daylight modeling package.

The system models 646 may be obtained from the supplier model library, which may include standard engine, sensor, and light fixture modules 662, 664, and 666. The supplier may build the models from data provided by the device manufacturer, actual device characterizations performed by independent sources, such as industry and government standards labs, and historical data obtained from previously deployed systems.

The demand model 606 may determine a solution that satisfies the competing demands originating from other predictive models 204, such as light level requirements for a particular space, and translate that solution into the device control parameters 218, such as the power levels 220 for the light fixtures 102 that are located in the particular space. In one example, the system 100 and 200 may produce light only where and when needed in order to minimize energy consumption. The demand model 606 may sit at the crossroads between the management goals and the device control parameters 218 to achieve a balance between competing goals. The demand model 606 may receive inputs from the business models 602, assess the state of the lighting system 100 and the physical site 118 using the physical models 604, and determine device control parameters 218, such as power levels 220 for each of light fixtures 102 as a function of time. Thus, the demand model 606 may determine which light fixtures 102 are lit, by how much, and when, while meeting the business goals, such as achieving acceptable levels of productivity, maintenance, energy usage, and aesthetics.

The demand model 606 may divide the task of determining the device control parameters 218 into smaller sub-tasks, which are handled by sub-models. Each of the sub-models may utilize optimization techniques, such as linear programming, hill climbing, goal seeking, and neural networks, in order to achieve an optimal solution for the particular sub-task. In general, the sub-tasks may be formulated so as to satisfy the demands of the business models 602, such as productivity and energy, in view of the current state of the site, such as natural and non-system lighting conditions, plenum air temperatures, and locations of the occupants 126.

The spatial demand model 668 may determine a solution for how much light the lighting system 100 is to produce for each applicable area, surface, or any combination thereof, in the physical site 118. For example, the solution may be based on demands for productivity and aesthetics tempered by constraints on energy and maintenance, and considering estimates of natural and non-system artificial light.

The occupant demand model 670 may combine the output of the spatial demand model 668 with that of the occupancy model 652 to produce a solution that may limit light production requested by the spatial demand model 668 based on the areas where the occupants 126 are located. The occupant demand model 670 may also take into account the predicted motion of the occupants 126 so that localized light production precedes the occupants 126, such as turning on lighting in a hallway, stairwell, or room, prior to entry by the occupants 126.

The manual demand model 672 may combine the output of the occupant demand model 670 with the immediate demands indicated by the user input 226 received from the input devices 106 or by the operator in the form of system overrides. An example of a system override may include a light level setting for a particular lighting area, which was entered by the operator. The manual override may take top priority, but may be subject to interpretation in order to determine which system override to violate and the duration of violation. The output of the manual demand model 672 may be the device control parameters 218, such as the power levels 220 for the light fixtures 102.

The forward conversion component 238 of the predictive models 204 may convert the management goals 212 into the device control parameters 218. The forward conversion component 238 may base the conversion on the combination of the predictive models 204 described above.

Each of the predictive models 204 may implement a portion of the forward conversion using any number or combination of mechanisms, such as table look-ups, an associative mapping, a numeric or logical algorithm, mathematical formulas, and simulation of physical processes, such as light reflection and heat flow. Individual predictive models 204 may progressively convert the management goals 212 into the device control parameters 218. For example, two of the predictive models 204 may first determine predicted light levels and lamp temperatures, respectively, by location over time. A third one of the predictive models 204 may then determine the power levels 220 of the light fixtures 102 by location over time based on the predicted light levels and the lamp temperatures. The goal-based control system 200 may subsequently set the power levels 220 for the light fixtures 102 over time and predict appropriate power levels 220 at an arbitrary time in the future.

As an illustrative example, consider an example of the goal-based system 200 that includes just two management goals 212: the productivity goal and the energy goal. Accordingly, the predictive models 204 may include the productivity model 608 and the energy model 610, which correspond to the two management goals 212. The predictive models 204 may also include the site model 644, the system model 646, and the demand model 606.

The productivity model 608 in the illustrative example may determine productivity in accordance with a productivity function, P(light level$_i$, location$_i$), where location$_i$ is a lighting area in the physical site 118, light level$_i$ is the light level at that location, and i ranges from 1 to the number of locations being modeled. Target lighting levels may have been configured in the productivity model 608, where the target lighting levels are lighting levels determined to result in optimum productivity for the tasks performed at the locations. Rewards may be associated with each of the target lighting levels. Costs may be associated with various deviations therefrom. For example, the portion of the productivity function determined for any location$_i$, may be a function $P_i$, such as:

$$P_i = \text{reward}*\text{target light level}_i - \text{cost}*\text{abs}(\text{target light level}_i - \text{light level}_i)$$

where abs( ) is the absolute value function, and where reward and cost are constants representing the rewards and costs, respectively. Accordingly, the value of the productivity function, P(light level$_i$, location$_i$), may be the sum of $P_i$, the average of $P_i$, a weighted function of $P_i$, or any other suitable function of $P_i$.

The energy model 624 in the illustrative example may determine energy in accordance with an energy function, E(t, power level$_f$), where t is time, power level$_f$ is the power level 220 for one of the light fixtures 102, and f ranges from 1 to the number of the light fixtures 102 being modeled. E may be the sum of the power levels 222 for the light fixtures 102 being modeled multiplied by the cost of energy. The cost of energy may be a function of time. Therefore, E(t, power level$_f$) may be easily calculated.

The system model 646 in the illustrative example may determine light level output by each one of the light fixtures 102 with the function, LO$_f$(t, power level$_f$), where t is time, power level$_f$ is the power level 220 for one of the light fixtures 102, and f ranges from 1 to the number of the light fixtures 102 being modeled. For example, LO$_f$(t, power level$_f$) may be equal to k * power level$_f$*$(1-e^{-(t-T_{failure})})$, where k is a conversion constant, $T_{failure}$ is the time at which the light fixture will no longer produce light, f identifies the light fixture 102 being modeled, and $t<T_{failure}$.

The site model 644 in the illustrative example may determine the light level for each of the locations in the physical site 118 being modeled. The site model 644 maps each of the light fixtures, f, to locations in the physical site 118. Therefore, the site model 644, may determine the light level for a particular location, light level$_i$, as a function of LO$_f$, such as LL$_i$ (LO$_f$).

Based on the above equations, productivity, P(light level$_i$, location$_i$), may be re-written as P(LL$_i$(LO$_f$(t, power level$_f$)), location$_i$), where i ranges from 1 to the number of locations and f ranges from 1 to the number of the light fixtures 102. Thus, P may be calculated as a function of time and the power levels 220 to the light fixtures 102. Similarly, energy, E(t, power level$_f$) may be calculated as a function of time and the power levels 220 to the light fixtures 102.

The demand model 606 may analyze the productivity function, P, in order to determine a maximum productivity, $P_{max}$. In one example, the maximum productivity, $P_{max}$, may not depend on time. In a second example, the maximum productivity, $P_{max}$, depends on time. In one example, the demand model 606 may further analyze both the productivity function, P, and the energy function, E, together in order to find the minimum value of the energy function when the productivity is $P_{max}$. In one example, the minimum value of the energy function when the productivity is $P_{max}$ may be considered the maximum energy value, $E_{max}$. In a second example, the maximum energy, $E_{max}$ may be the maximum of the energy function when the light fixtures 102 are at full power.

The demand model 606 may balance the management goals 212 based on the maximum productivity, $P_{max}$ and the maximum $E_{max}$ and on the management goals 212. The management goals 212 may include ranges for acceptable values of corresponding goal functions in the business models 602. The range of acceptable values for a goal may be based on the maximum value of the corresponding goal function in the business models 602. For example, the upper adjustable thumb 350 of the slider control 310 for the productivity goal in FIG. 3 may indicate that the upper end of the range of acceptable values of the productivity function is 80 percent of the maximum productivity, $P_{max}$. Similarly, the lower adjustable thumb 355 of the slider control 310 may indicate that the lower end of the range of acceptable values for the productivity function is 20 percent of the maximum productivity, $P_{max}$. The demand model 606 may, for any given time, solve for suitable device control parameters 218 such that the goal functions provide values that fall within the ranges specified in the management goals 212. For example, so that the value of the productivity function is between 20 percent of $P_{max}$ and 80 percent of $P_{max}$.

As described above costs and rewards may be assigned to quantify various business aspects. Studies, such as productivity studies, may form a basis for determining appropriate costs and rewards. As newer studies are performed, costs and rewards may be adjusted accordingly When solving for the suitable device control parameters 218, the demand model 606 may attempt to find solutions such that the goal functions provide values toward the upper or lower ends of the range, depending on the goal. If the demand model 606 determines that multiple solutions fall within the ranges specified by the business goals 212, the demand model 606 may be biased to select the solution that falls in the upper range of one goal and the lower range of another. For example, the demand model 606 may attempt to find a solution such that the productivity function evaluates to a value toward the upper end of the range in the productivity goal, but that evaluates to a value towards the lower end of the range in the energy consumption goal.

The forward conversion may be a many-to-many conversion, which means that multiple management goals 212 may be converted into multiple device control parameters 218. Thus, the forward conversion component 238 may apply Monte Carlo or exhaustive coverage techniques in order to identify solutions for the suitable device control parameters 218.

Monte Carlo techniques refer to a class of computational algorithms that rely on repeated random sampling to compute results. To determine a result, applying a Monte Carlo technique may involve: determining a domain of possible inputs; generating inputs randomly from the domain using a specified probability distribution; generating a deterministic computation using the inputs; aggregating the results of the individual computations into the final result.

For example, in the forward conversion, the domain may include the goals, the possible values for the goals, and the limits of the goal ranges specified by the operator. Candidate device control parameters 218 resulting from the forward conversion trials may be gathered and analyzed. The low-level parameters best matching the goal ranges may be the device control parameters 218.

The reverse conversion component 240 of the predictive models 204 may convert the device control parameters 218 into the management goals 212. The conversion may be a many-to-many conversion, which means that multiple device control parameters 218 may be converted into multiple management goals 212. The reverse conversion component 240 may base the conversion on the combination of the predictive models 204 described above.

In one example, the reverse conversion component 240 may perform the reverse conversion as simple inverses to the corresponding forward conversion described above. For example, the inverses may include an inverse mapping table or a mathematical inverse function derived from of a mathematical formula that performs the forward conversion. In one example, the energy cost determination may be a simple inverse look up in a power rate table. Lamp efficacy, as a sub-goal under the maintenance goal, may be modeled as an inverse of a mathematical formula that converts an age of the lamp, power consumption, and a temperature into lamp efficacy.

In a second example, the reverse conversion component 240 may perform inverse dynamic simulations. For example, in order to determine light fixture efficacy, which may involve the light fixture as a whole, may involve simulation of the physical deterioration of the light fixture reflector and electronics over time.

Because the reverse conversion may be a many-to-many conversion, the reverse conversion component 240 may apply Monte Carlo or exhaustive coverage techniques in order to identify confidence estimates 214 and the actual performance 216. For example, in order to determine the confidence estimates 214, designers of the predictive models 204 may assign confidence factors to forward and reverse conversion paths, processes, and state values throughout the predictive models 204, using statistical and/or fuzzy logic techniques. The portions of the predictive models based on empirical results and refinement may be assigned a higher degree of confidence than portions based on extrapolations, estimates, or poorly understood heuristics. As discussed above, the forward conversion component 238 may apply Monte Carlo or exhaustive coverage techniques. As the forward conversion component 238 iteratively applies inputs, confidence may be computed and accumulated along the forward conversion paths based on the assigned confidence factors. The result may be a confidence factor for each one of the device control parameters 218. The total confidence for a set of the device control parameters 218 may be proportioned to the corresponding input management goals 212 and the confidence factors. In one example approach to assessing confidence values are converted either in the forward conversion or the reverse conversion. The outputs that have the highest number of values in ranges of the management goals have higher confidence estimates 214. In a second example approach, confidence factors may be assigned to the various model components, formulas, and state value ranges. The two would be combined to achieve a total assessment of confidence. Thus, with repeated iteration, the total confidence for each value of each goal may be accumulated and caused to be displayed in the GUI 114

The developer of the predictive models 204 may include estimates of confidence in the form of the confidence factors. The estimates may be verified and refined by the system supplier through on-site audits and through ongoing improvements to the supplier model library. On-site audits may facilitate measurement of predicted and actual values independent of the system. The values may be obtained throughout the physical site 118, by, for example, random sparse sampling. Sparse sampling is a technique for acquiring and reconstructing a signal utilizing prior knowledge that the signal is sparse. The audit results may be integrated and analyzed using conventional statistical techniques. The supplier may update and refine the confidence factors throughout the models in the supplier model library. Eventually the updated models 234 and 236 may be incorporated into existing and future systems.

6. Adaptive Models.

The adaptive models 208 may employ pattern detection and recognition over time in order to produce models for the patterns 228, such as environmental, occupancy, and demand patterns. The adaptive models 208 may provide advantages such as: aid in achieving business goals while minimizing undesirable effects, such as cycling of lights in high traffic areas; augment predictive model operation with a posteriori data, such as enhanced light and occupancy models 654 and 652; minimize manual scheduling of system operation because the adaptive models 208 may learn a suitable schedule based on the patterns 228 over the medium-term; update the predictive models 204 through self-correction and tuning;

update the supplier model library over the long-term by providing updated models 234 and 236 to the goal-based control system 200.

Each physical site 118 may be unique. For example, the architectural layout, business purpose, and occupant population may be unique to an installation. Some aspects of the physical site 118, the lighting system 100, and use thereof, may be specified and modeled in an a priori fashion by the predictive models 204. Other aspects are not. Instead, over time, the adaptive models 208 may learn rhythms and patterns of the site environment, the occupants 126, and usage of the system 100 by the occupants 126, whether through normal automatic operation or manual override.

Site model data from site model 644 combined with time may be inputs to the adaptive models 208. Actual patterns of natural and artificial light, the location and movement of the occupants 126 through the physical site 118 may be detected, analyzed, and modeled. Subsequent inputs may reinforce or erode earlier estimates, as in a self-learning system, such as a neural network. Detection and modeling of the patterns 228 may minimize or eliminate manual scheduling of system task, such as scheduling periods and patterns of normal operation.

When one of the patterns 228 becomes sufficiently significant, with a sufficient degree of confidence, the adaptive models 208 may provide information about the pattern 228 to the predictive models 204 in order to improve performance thereof. On a larger time-scale, the adaptive models 208 may transmit the pattern logs 232 to the system supplier module 210 for inclusion in the supplier model library. By capturing such collective wisdom about actual system usage and performance, the supplier may then disseminate improved updated models 234 and 236 to existing systems, and incorporate the updated models 234 and 236 into new systems for improved "out of the box" performance.

Figure 7:
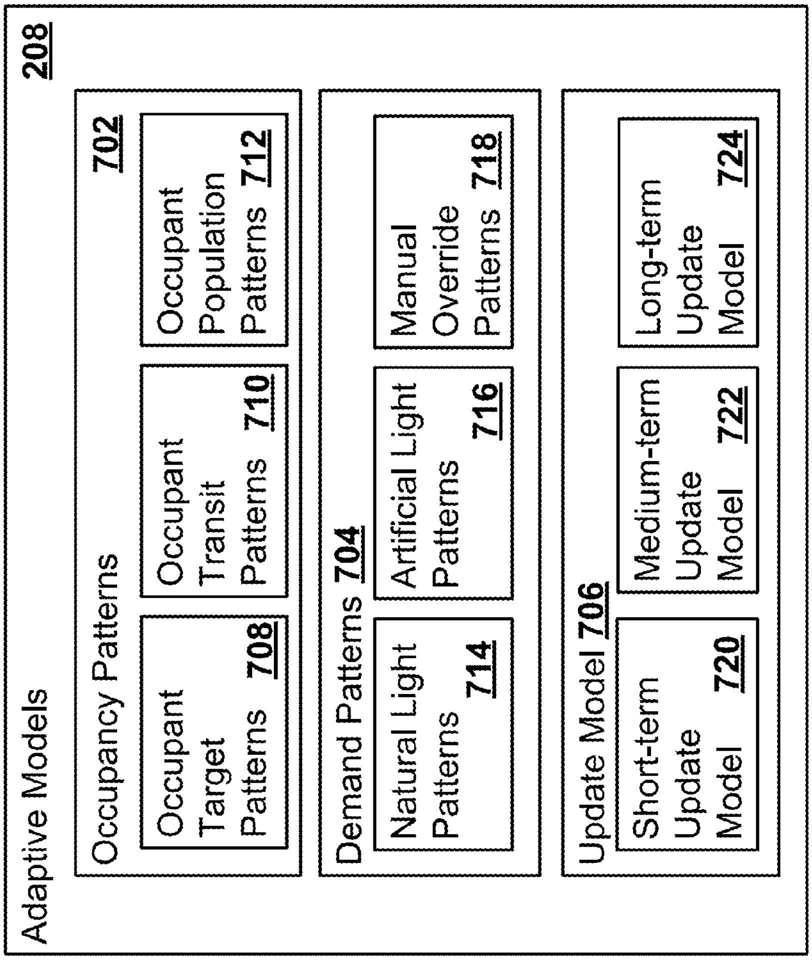
FIG. 7 illustrates an example of adaptive models.

FIG. 7 illustrates an example of the adaptive models 208. The adaptive models 208 may include occupancy patterns 702, demand patterns 704 and update models 706. The adaptive models 208 may include additional, fewer, or different components.

The occupancy patterns 702 may include occupant target patterns 708, occupant transit patterns 710, and occupant population patterns 712. The occupancy patterns 702 may include additional, fewer, or different components.

The demand patterns 704 may include natural light patterns 714, artificial light patterns 716, and manual override patterns 718. The demand patterns 704 may include additional, fewer, or different components.

The update models 706 may include a short-term update 720, a medium-term update model 722, and a long-term update model 724. The update models 706 may include additional, fewer, or different components.

The occupancy patterns 702 may model patterns of the occupants 126. In particular, the occupancy patterns 702 may model when, where, and how the occupants 126 enter and exit the physical site 118, transit through the physical site 118, and congregate and dwell in the physical site 118. Particular doorways, corridors, and work spaces and utility spaces may be used more than others and at different times. The occupancy patterns 702 may build a model of such patterns over time using, for example, unsupervised and reinforcement AI learning techniques, such as neural networks.

The occupant target patterns 708 may characterize and generalize the movement of individual occupants 126, as a target class, in and through the physical site 118. The occupant target patterns 708 may characterize maximum target velocity, frequency of velocity changes, and the nature of those changes, such as stops, turns, directions, or any other velocity related information. The velocity related information may be used by the predictive occupancy model 652 to better perform target detection and tracking by assigning higher weights to expected behavior, and lower weights to unexpected behavior.

The occupant transit patterns 710 may characterize traffic patterns into, through, and out of the physical site 118. The architectural model 648 data may provide a starting point for the occupant transit patterns 710 because fixed traffic routes may be constrained by architecture, such as through doorways and corridors. The occupant transit patterns 710 may discover additional routes, over time, through open areas, such as lobbies and open office areas. By combining transit routes with time of day and week, the occupant transit patterns 710 may identify the most heavily used routes, and when the routes are used. Such a posteriori data, when combined with a priori scheduling data, such as normal business times for a given type of business, holidays, weekends, or other standard information, may form a basis for the determining unsupervised operation scheduling.

The occupant population patterns 712 may characterize the number of occupants 126 present in the physical site 118 at various times of day and week (global usage patterns), and where the occupants 126 tend to congregate and dwell (local usage patterns). The global usage patterns and local usage patterns may augment and improve the predictive occupancy model 652, by increasing the chance of avoiding false positives and negatives. For example, if a work space is typically occupied at a particular time, the likelihood of occupation in the occupancy model 652 may be weighted more heavily than before, thereby improving detection, reducing false negatives, and minimizing annoying fluctuations in light level.

The demand patterns 704 may model general patterns of external inputs to the lighting system 100. Examples of external inputs include natural and man-made environment inputs, and manual overrides by occupants 126 that control the lighting system 100. For example, the demand patterns 704 may model when, where, and how natural and uncontrolled artificial light enters and affects the physical site 118, and how individuals respond to those effects and others via explicit control overrides. The demand patterns 704 may augment and improve the demand model 606, or any other model included in the predictive models 204.

For example, at certain times of day and year particular areas of the physical site 118 may receive more or less external light than at other times. Information about the variations in external light, learned by the system 200 over time or provided to the system, may aid the business models 602 to predict energy and maintenance costs. Alternatively or in addition, patterns of manual override of system operation when correlated with other patterns and inputs, such as occupant congregation and ambient light levels, may augment and improve the ability of the goal-based control system 200 to anticipate deviations from predicted operation, thereby minimizing energy usage and undesired lighting effects.

The natural light patterns 714 may characterize when and where natural light enters the physical site 118, and how that light affects the physical site 118 in terms of controlled lighting needs and moderation techniques to eliminate localized heat and glare. Multiple aspects of the lighting system 100 may be predicted using a priori models and inputs such as time of day and year, location and orientation of the physical site 118, and architectural information in the form of the natural light model 660. Other architectural information, such as shading effects by structures or changes around the physical site 118, and the installation and operation of awnings and blinds subsequent to configuration of the goal-based control system 200, may be specific to the physical site 118 and learned after the system 200 is in use. Over the long-term, information from the natural light patterns 714 may augment and improve the predictive abilities of the business models 602 to estimate energy usage and system operation costs.

The artificial light patterns 716, similar to the natural light patterns 714, may characterize the presence and use of artificial light in the physical site 118. The artificial light maybe from a pre-existing lighting system, as well as task lighting introduced into the physical site 118 by individuals or as part of work space provisioning, but that are not controlled by the lighting system 100, such as desk lamps and under-shelf lighting. The patterns of artificial light usage combined with occupancy and other factors may improve predictions by the business models 602, and improve the design of future systems, over the long-term, by better understanding the balance and use of general versus individual lighting and its control.

The manual override patterns may characterize when, where, and how individual occupants 126 override the automatic operation of the systems 100 and 200. Manual controls may be provided so that automatic operation may be overridden as desired by the occupants 126. Patterns of manual override combined with occupancy and other factors may improve predictions by the business models 608, and improve the design of future systems, over the long-term, by better understanding the quantity, placement, and operation of the input devices 106 throughout the physical site 118.

As described above, the adaptive models 208 may discover the patterns 228 and build corresponding models over a range of time frames. The nature of the consumer of adaptive model information, such as one of the predictive models 204 or the system supplier module 210, may determine the frequency and quality of the model update.

In general, medium-term updates from the adaptive models 208 may be directed to the predictive models 204 operating in the goal-based control system 200. The updates may serve to improve and augment the operation of the predictive models 204, thereby forming a medium-term feedback loop in the system. Long-term updates to the models may be directed to the supplier model library, for eventual distribution to existing systems, and incorporation into new systems.

Other factors, such as large or frequent deviations from typical rates of pattern discovery may trigger more frequent updates to the system supplier module 210. Such updates may be in the form of "alerts" that notify the supplier of potential problems with the goal-based control system 200.

Figure 8:
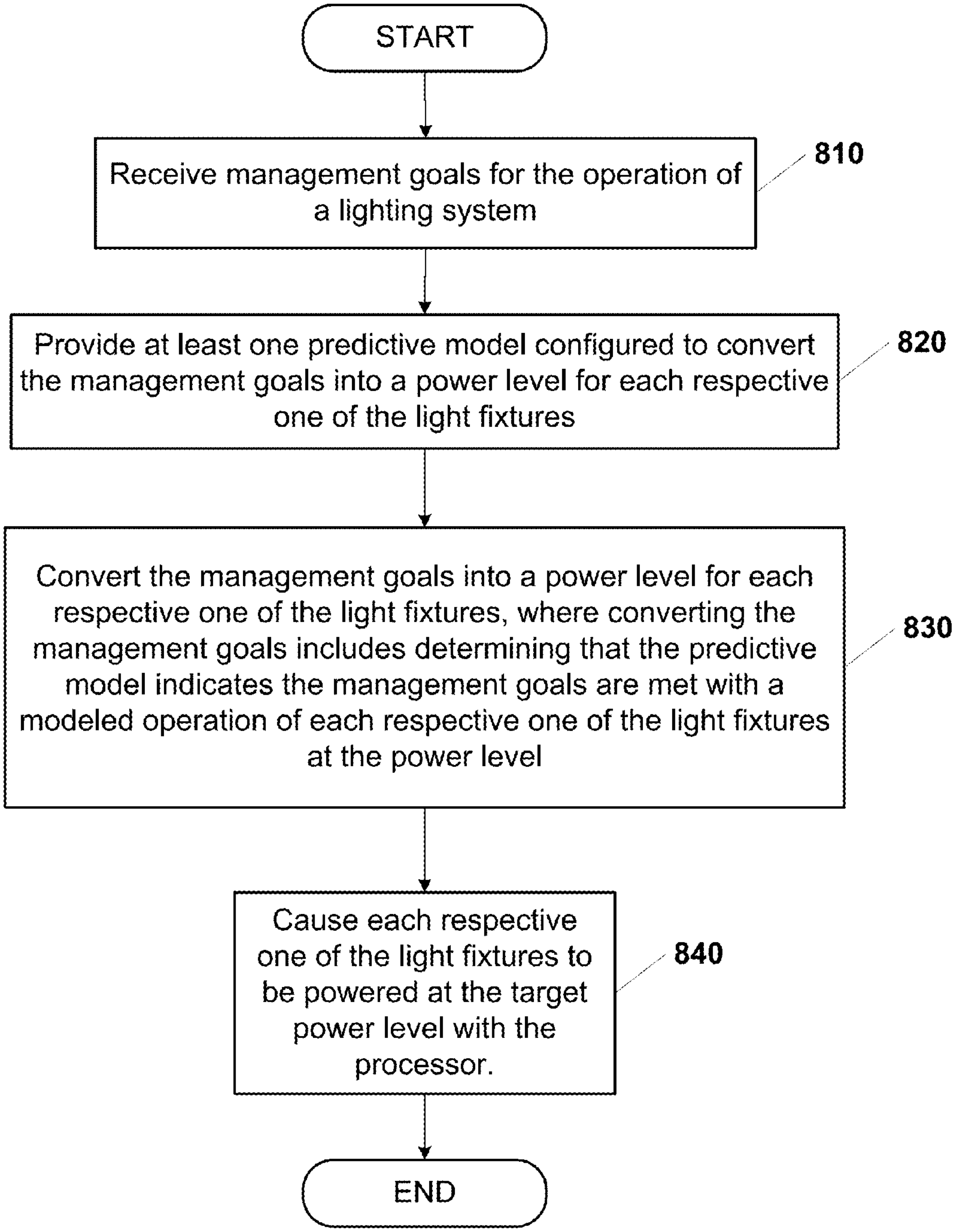
FIG. 8 illustrates an example flow diagram of the logic of one embodiment of a goal-based control system.

FIG. 8 illustrates an example flow diagram of the logic of one embodiment of the goal-based control system 200. The logic may include additional, different, or fewer operations. The operations may be executed in a different order than illustrated in FIG. 8.

The management goals 212 for the operation of the lighting system 100 may be received (810). For example, the goal module 202 may receive a range of values for each of the management goals 212 from the GUI 114. In a second example, the predictive models 204 may receive the management goals 212 from the goal module 202.

The predictive models 204 may be provided (820). The predictive models 204 may be configured to convert the management goals 212 into a power level 220 for each respective one of the light fixtures 102 (820). In one example the power level 220 for one of the light fixtures 102 may be different from another one of the light fixtures 102.

The management goals 212 may be converted into the power level 220 for each respective one of the light fixtures 102 with the processor, wherein converting the management goals 212 may include determining the predictive models 204 indicate the management goals 212 are met with a modeled operation of each respective one of the light fixtures 102 at the power level 220 (830). For example, the predictive models 204 may determine that a value for each of the management goals 204 is within a range of values included in the management goals 204, where the value is generated by a goal function that is a function of the power levels 220.

The hardware interface module 206 may cause each respective one of the light fixtures 102 to be powered at the target power levels (840). For example, the hardware interface module 206 may alter the power distributed to the light fixtures 102 over the data network 110 to match the target power levels. In a second example, one or more messages may be sent over the data network 110 to a power device, where the power device alters the power distributed to the light fixtures 102 to match the power levels 220.

The operation may end, for example, by the light fixtures 102 producing light such that the management goals 212 are met. In a different example, the operation may end by causing the confidence estimates 214 to be displayed.

Figure 9:
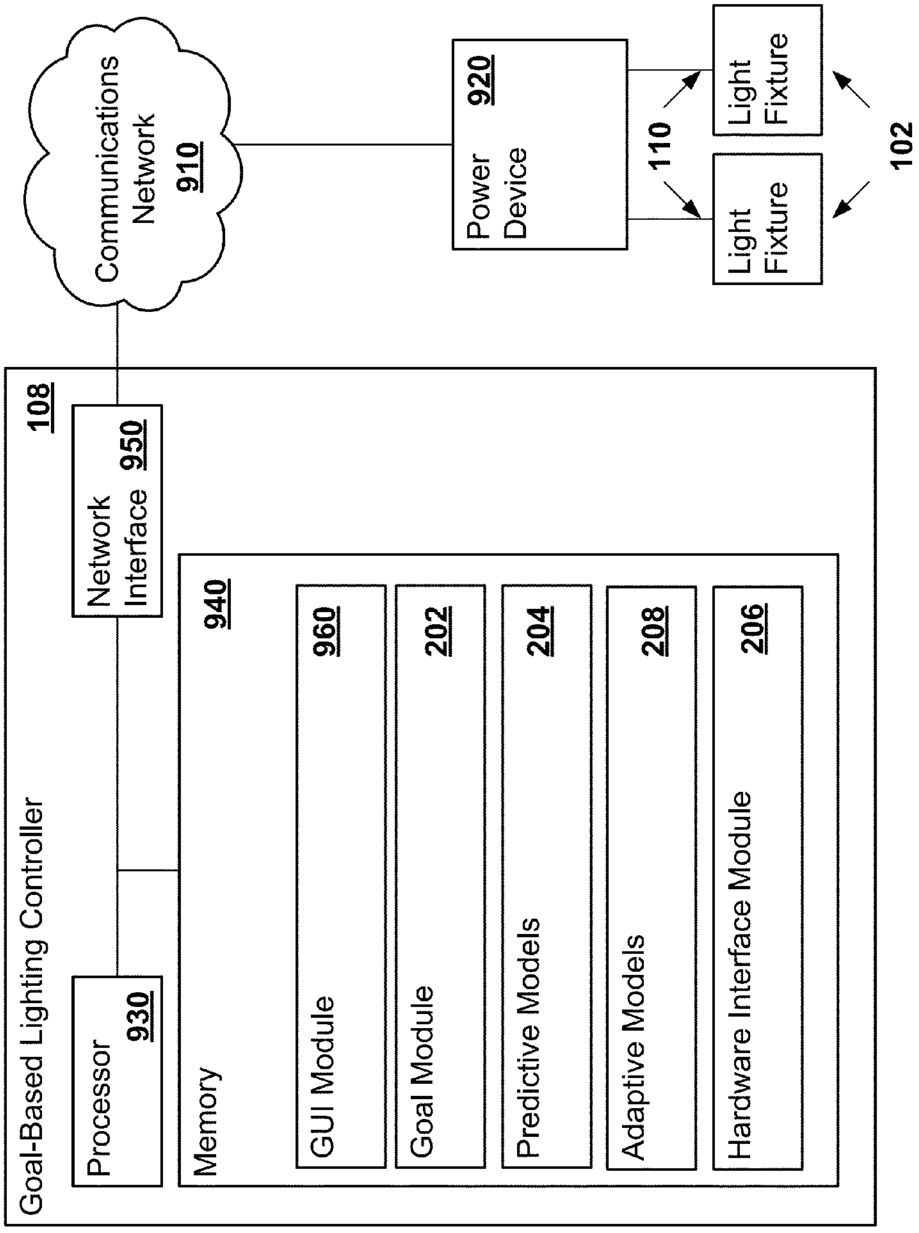
FIG. 9 illustrates an example of a hardware diagram of a goal-based lighting controller and supporting entities.

FIG. 9 illustrates an example of a hardware diagram of the goal-based lighting controller 108 and supporting entities, such as a communications network 910, the power device 920, the data network 110, and the light fixtures 102, that may implement the goal-based control system 200, the lighting system 100, or both. The goal-based lighting controller 108 includes a processor 930, a memory 940, and the network interface 950. As discussed above, the goal-based lighting controller 108 may include fewer, additional, or different components. For example, the goal-based lighting controller 108 may not include the GUI module 960. The memory 940 holds the programs and processes that implement the logic described above for execution by the processor 930. As examples, the memory 940 may store program logic that implements a GUI module 960, the goal module 202, the predictive models 204, the adaptive models 208, and the hardware interface model 206.

The systems 100 and 200 may be implemented in many different ways. For example, although some features are shown stored in computer-readable memories (e.g., as logic implemented as computer-executable instructions or as data structures in the memory 940), all or part of the systems and the logic and data structures of the systems 100 and 200 may be stored on, distributed across, or read from other machine-readable media or computer-readable storage media. Examples of computer-readable storage media include hard disks, floppy disks, CD-ROMs, random access memory (RAM), or any other computer readable storage me.

The systems 100 and 200 may be implemented with additional, different, or fewer entities. As one example, the processor 930 may be implemented as a microprocessor, a microcontroller, a DSP, an application specific integrated circuit (ASIC), discrete logic, or a combination of other types of circuits or logic. As another example, the memory 940 may be a non-volatile and/or volatile memory, such as a random access memory (RAM), a read-only memory (ROM), an erasable programmable read-only memory (EPROM), flash memory, any other type of memory now known or later discovered, or any combination thereof. The memory 940 may include an optical, magnetic (hard-drive) or any other form of data storage device.

The processing capability of the systems 100 and 200 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library, such as a dynamic link library (DLL). The DLL, for example, may store code that prepares intermediate mappings or implements a search on the mappings. As another example, the DLL may itself provide all or some of the functionality of the goal-based control system 200. Moreover, the various modules and screen display functionality are but one example of such functionality and any other configurations encompassing similar functionality are possible.

The processor 930 may be in communication with the memory 940 and the network interface 950. In one example, the processor 930 may also be in communication with additional elements, such as a display. The processor 930 may be a general processor, central processing unit, server, application specific integrated circuit (ASIC), digital signal processor, field programmable gate array (FPGA), digital circuit, analog circuit, or combinations thereof.

The processor 930 may be one or more devices operable to execute computer executable instructions or computer code embodied in the memory 940 or in other memory to perform the features of the goal-based control system 200, the lighting system 100, or both. The computer code may include instructions executable with the processor 930. The computer code may include embedded logic. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code.

The network interface 950 may include hardware or a combination of hardware and software that enables communication over at least one of the data network 110 and the communications network 910. The network interface may provide physical access to a network. The network interface 950 may include a network card that is installed inside a computer or other device. Alternatively, the network interface 950 may include an embedded component as part of a circuit board, a computer mother board, a router, an expansion card, a USB (universal serial bus) device, or as part of any other hardware. In one example, the network interface 950 operates on a proprietary network.

The GUI module 960 may be any logic that generates or implements the GUI 114. For example, the GUI module 960 may include a web server and a web application that may be accessed by web clients from, for example, the user computing device 112. Alternatively or in addition, the GUI module 960 may include an implementation of the GUI 114.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. For example, although the emphasis above is on lighting, the same approach for predictive model formulation and use may be applied to other building management functions, such as HVAC, safety and security, and non-lighting management, and alternative energy management. Accordingly, the innovation is not to be restricted except in light of the attached claims and their equivalents.

What is claimed is:

1. A goal-based lighting controller, the goal-based lighting controller comprising:

a network interface;

a lighting system model of a lighting system, the lighting system comprising a plurality of individual light fixtures that light a site;

a graphical user interface configured to concurrently graphically display a plurality of management goals for operation of the lighting system, wherein the plurality of management goals that are concurrently graphically displayed comprise two or more of a productivity, maintenance, energy or aesthetics management goal, wherein the plurality of management goals that are concurrently graphically displayed do not identify operational parameters of the individual light fixtures that light the site, the graphical user interface further configured to receive a respective management goal value for a respective one of the two or more management goals for operation of the lighting system, and wherein the respective management goal values also do not identify operational parameters of the individual light fixtures that light the site;

a goal module configured to receive the respective two or more management goal values from the graphical user interface;

a demand model configured to convert the two or more management goal values into a power level for at least one of the individual light fixtures, wherein the demand model determines that a modeled operation of the at least one of the individual light fixtures at the power level indicates the two or more management goal values would be met if the at least one of the individual light fixtures was operated at the power level; and a hardware interface module in communication with the network interface, wherein the hardware interface module is configured to cause the at least one of the individual light fixtures to operate at the power level.

2. The goal-based lighting controller of claim 1, wherein the management goals include a productivity goal and an energy consumption goal.

3. The goal-based lighting controller of claim 1, further comprising a reverse conversion module configured to determine a likelihood of meeting at least one of the management goals.

4. The goal-based lighting controller of claim 1, further comprising a reverse conversion module configured to determine an actual performance of the lighting system for at least one of the management goals based on sensor data received via the hardware interface module from at least one sensor in the lighting system.

5. The goal-based lighting controller of claim 1, wherein the lighting system model of the lighting system is updated in response to sensor data received from at least one sensor in the lighting system.

6. The goal-based lighting controller of claim 1, wherein the lighting system model of the lighting system determines a value for at least one of the management goals from the power level for at least one of the light fixtures applied to a corresponding goal function, and the management goals are met when the value generated from the corresponding goal function is within a range included in the at least one of the management goal values.

7. The goal-based lighting controller of claim 6, wherein the range included in the at least one of the management goals is based on a maximum of the corresponding goal function.

8. A non-transitory computer-readable storage medium encoded with computer executable instructions, the computer executable instructions executable with a processor, the computer-readable medium comprising:

at least one model of a lighting system, wherein the lighting system includes a plurality of individual light fixtures that light a site;

instructions executable to concurrently graphically display a plurality of management goals for operation of the lighting system, wherein the plurality of management goals that are concurrently graphically displayed comprise two or more of a productivity, maintenance, energy or aesthetics management goal, wherein the plurality of management goals that are concurrently graphically displayed do not identify operational parameters of the individual light fixtures that light the site, the instructions further executable to receive a respective management goal value for a respective one of the two or more management goals for operation of the lighting system, and wherein the respective management goal values also do not identify operational parameters of the individual light fixtures that light the site;

instructions executable to receive the two or more respective management goal values from a user interface;

instructions executable to convert the two or more management goal values into a power level for at least one of the individual light fixtures based on a modeled operation of the lighting system with the at least one model of the lighting system, wherein the instructions executable to convert the two or more management goals are further executable to determine the power level for the at least one of the individual light fixtures such that the two or more management goal values for the modeled operation of the lighting system are satisfied when the at least one of the individual light fixtures is operated at the power level in the modeled operation of the lighting system; and instructions executable to cause the at least one of the individual light fixtures to be powered at the power level.

9. The computer-readable storage medium of claim 8, wherein the at least one model of the lighting system is executable to predict a plurality of future power levels for the at least one of the individual light fixtures that satisfy the management goal values.

10. The computer-readable storage medium of claim 9 further comprising instructions executable to determine a likelihood that operation of the at least one of the individual light fixtures at the future power levels satisfies the management goal values.

11. The computer-readable storage medium of claim 8, wherein the at least one model of the lighting system includes a business model for at least one of the management goals, a physical model, and a demand model, wherein the physical model includes a model of the site lit by the lighting system and a model of a plurality of devices in the lighting system, and the demand model is executable with the processor to determine when and where in the site light is demanded based on when and where occupants are in the site and on an output of the at least one business model for the at least one of the management goals.

12. The computer-readable storage medium of claim 8, wherein the at least one model of the lighting system includes an adaptive model executable with the processor to determine at least one occupant pattern based on sensor data received from sensors in the lighting system over a period of time, wherein the instructions executable to convert the management goals are further executable to alter conversion of the management goals based on the at least one occupant pattern.

13. The computer-readable storage medium of claim 8, further comprising instructions executable to update the at least one model of the lighting system in response to data received from sensors and input devices in the lighting system.

14. A computer-implemented method to control lighting, the computer-implemented method comprising:

concurrently graphically displaying a plurality of management goals for operation of a lighting system that lights a site, wherein the plurality of management goals that are concurrently graphically displayed comprise two or more of a productivity, maintenance, energy or aesthetics management goal and wherein the plurality of management goals that are concurrently graphically displayed do not identify operational parameters of individual light fixtures that light the site;

receiving a respective management goal value for a respective one of the two or more management goals for operation of the lighting system, wherein the respective management goal values also do not identify operational parameters of the individual light fixtures that are associated with the site;

providing at least one predictive model configured to convert the two or more management goal values into a power level for at least one of the individual light fixtures;

converting the two or more management goal values into the power level for the at least one of the individual light fixtures with a processor, wherein converting the two or more management goal values includes determining the at least one predictive model indicates the two or more management goal values are met with a modeled operation of the at least one of the individual light fixtures at the power level; and causing the at least one of the individual light fixtures to be powered at the power level with the processor.

15. The computer-implemented method of claim 14 further comprising determining a likelihood of satisfying at least one of the management goal values with the processor and causing the likelihood of satisfying the at least one of the management goal values to be displayed.

16. The computer-implemented method of claim 14 further comprising receiving a change to at least one of the management goal values and re-converting the management goal values into an updated power level for at least of the individual light fixtures.

17. The computer-implemented method of claim 14 further comprising:

determining at least one occupancy pattern over time based on sensor data received from the lighting system;

transmitting a pattern log determined from the at least one occupancy pattern to a system supplier model; and updating the at least one predictive model from an updated predictive model received from the system supplier model.

18. The computer-implemented method of claim 14, the at least one predictive model including an aesthetic model and a maintenance model.

* * * * *

UNITED STATES PATENT AND TRADEMARK OFFICE

CERTIFICATE OF CORRECTION

PATENT NO. : 8,706,310 B2
APPLICATION NO. : 12/815886
DATED : April 22, 2014
INVENTOR(S) : Barrilleaux It is certified that error appears in the above-identified patent and that said Letters Patent is hereby corrected as shown below:

In the Specification:

Column 21, Line 51: Please correct "model 636" to read -- model 636. --

Column 29, Line 12: Please correct "accordingly" to read -- accordingly. --

Column 30, Line 39: Please correct "the GUI 114" to read -- the GUI 114. --

Column 34, Line 48: Please correct "readable storage me." to read -- readable storage media. --

In the Claims:

Column 39, Claim 16, Line 14: Please correct "for at least of the" to read -- for at least one of the --

Signed and Sealed this
Twenty-fifth Day of November, 2014

Michelle K. Lee

Michelle K. Lee
*Deputy Director of the United States Patent and Trademark Office*